United States Patent
Cheon et al.

(10) Patent No.: US 10,462,133 B2
(45) Date of Patent: *Oct. 29, 2019

(54) METHOD FOR PROVIDING USER INTERFACE FOR EACH USER, METHOD FOR PERFORMING SERVICE, AND DEVICE APPLYING THE SAME

(71) Applicant: Samsung Electronics Co., Ltd., Gyeonggi-do (KR)

(72) Inventors: Ka-won Cheon, Seoul (KR); Pil-seung Yang, Gyeonggi-do (KR); Yeo-jun Yoon, Gyeonggi-do (KR); Kuk-hyun Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 293 days.

This patent is subject to a terminal disclaimer.

(21) Appl. No.: 15/397,393

(22) Filed: Jan. 3, 2017

(65) Prior Publication Data

US 2017/0118212 A1    Apr. 27, 2017

Related U.S. Application Data

(63) Continuation of application No. 14/722,917, filed on May 27, 2015, now Pat. No. 9,548,980, which is a
(Continued)

(30) Foreign Application Priority Data

Jun. 5, 2009  (KR) .................. 10-2009-0049798
Jun. 25, 2009 (KR) .................. 10-2009-0057214

(51) Int. Cl.
*H04L 29/06* (2006.01)
*G06F 1/3231* (2019.01)
(Continued)

(52) U.S. Cl.
CPC ........ *H04L 63/0876* (2013.01); *G06F 1/3231* (2013.01); *G06F 3/0481* (2013.01);
(Continued)

(58) Field of Classification Search
CPC .. G06F 1/3231; G06F 3/04817; G06F 3/0482; G06F 3/04842; G06F 3/0481;
(Continued)

(56) References Cited

U.S. PATENT DOCUMENTS 8,432,365 B2   4/2013  Kim et al.
2002/0101418 A1  8/2002  Vernier et al.
(Continued)

FOREIGN PATENT DOCUMENTS

CN    101237637    8/2008
EP    2 000 997    12/2008
(Continued)

OTHER PUBLICATIONS

Chinese Office Action dated Nov. 16, 2017 issued in counterpart application No. 201510342238.7, 16 pages.
(Continued)

*Primary Examiner* — Cao H Nguyen
(74) *Attorney, Agent, or Firm* — The Farrell Law Firm, P.C.

(57) ABSTRACT

A method and device for performing a service. The method includes detecting whether a user terminal device approaches an approach recognition area, receiving identifier information from the user terminal device, when it is detected that the user terminal device approaches the approach recognition area, obtaining user information based on the identifier information, and displaying a personalized area based on the user information.

18 Claims, 22 Drawing Sheets

Related U.S. Application Data continuation of application No. 13/214,938, filed on Aug. 22, 2011, now Pat. No. 9,063,652, which is a continuation-in-part of application No. 12/990,440, filed as application No. PCT/KR2010/003573 on Jun. 3, 2010, now Pat. No. 8,898,588.

(51) Int. Cl.

| | | |
|---|---|---|
| *G06F 3/0488* | (2013.01) | |
| *G06F 3/0481* | (2013.01) | |
| *G06F 3/0482* | (2013.01) | |
| *G06F 3/0484* | (2013.01) | |
| *H04L 29/08* | (2006.01) | |
| *H04W 12/06* | (2009.01) | |
| *H04W 8/22* | (2009.01) | |
| *H04W 76/11* | (2018.01) | |
| *G09G 5/14* | (2006.01) | |

(52) U.S. Cl.
CPC ........ *G06F 3/0482* (2013.01); *G06F 3/04817* (2013.01); *G06F 3/04842* (2013.01); *G06F 3/04886* (2013.01); *H04L 63/102* (2013.01); *H04L 67/10* (2013.01); *H04W 8/22* (2013.01); *H04W 12/06* (2013.01); *H04W 76/11* (2018.02); *G06F 2203/04803* (2013.01); *G06F 2221/2111* (2013.01); *G09G 5/14* (2013.01); *G09G 2354/00* (2013.01); *Y02D 10/173* (2018.01)

(58) Field of Classification Search
CPC . G06F 3/04886; H04L 63/0876; H04L 67/10; H04L 63/102; H04W 12/06; H04W 8/22; H04W 76/11
USPC .......................... 715/763–765, 851, 740, 748
See application file for complete search history.

(56) References Cited

U.S. PATENT DOCUMENTS

| | | |
|---|---|---|
| 2005/0183023 A1 | 8/2005 | Maruyama et al. |
| 2006/0294247 A1 | 12/2006 | Hinckley et al. |
| 2007/0220444 A1 | 9/2007 | Sunday et al. |
| 2007/0266185 A1 | 11/2007 | Goddi et al. |
| 2008/0192059 A1* | 8/2008 | Kennedy ............... G06F 3/0488 345/537 |
| 2009/0084612 A1 | 4/2009 | Mattice et al. |
| 2009/0085877 A1 | 4/2009 | Chang et al. |
| 2009/0094561 A1* | 4/2009 | Do ........................ G06F 3/0425 715/863 |
| 2011/0187675 A1 | 8/2011 | Nakai et al. |

FOREIGN PATENT DOCUMENTS

| | | |
|---|---|---|
| JP | 10-145661 | 5/1998 |
| JP | 2004-258766 | 9/2004 |
| JP | 2005-157135 | 6/2005 |
| JP | 2005-227487 | 8/2005 |
| JP | 2006-048139 | 2/2006 |
| JP | 2007-272365 | 10/2007 |
| JP | 2007-272927 | 10/2007 |
| JP | 2008-269044 | 11/2008 |
| JP | 2008-293419 | 12/2008 |
| WO | WO 2009/067676 | 5/2009 |

OTHER PUBLICATIONS

Chinese Office Action dated Jul. 17, 2018 issued in counterpart application No. 201510342238.7, 18 pages.
Korean Office Action dated Mar. 21, 2017 issued in counterpart application No. 10-2017-0018849, 9 pages.
Chinese Office Action dated Mar. 29, 2017 issued in counterpart application No. 201510342238.7, 15 pages.
Chinese Office Action dated Mar. 22, 2018 issued in counterpart application No. 201510342238.7, 17 pages.
Paul Dietz et al., "Diamond Touch: A Multi-User Touch Technology", pp. 219-226, 2001.
Chinese Office Action dated Jun. 3, 2014 issued in counterpart application No. 201080024576.1.
Korean Office Action dated May 26, 2016 issued in counterpart application No. 10-2016-0037112, 9 pages.
Japanese Office Action dated Jun. 15, 2015 issued in counterpart application No. 2012-513873, 9 pages.
Korean Office Action dated Jul. 16, 2015 issued in counterpart application No. 10-2009-0057214, 8 pages.

* cited by examiner

A: DEVICE
B: SERVICE PROVIDER
f(x,y) : FUNCTION IMPOSSIBLE FOR INVERSE TRANSFORMATION

METHOD FOR PROVIDING USER INTERFACE FOR EACH USER, METHOD FOR PERFORMING SERVICE, AND DEVICE APPLYING THE SAME

PRIORITY

This is a Continuation application under 35 U.S.C. § 120 of U.S. patent application Ser. No. 14/722,917, filed on May 27, 2015 in the United States Patent and Trademark Office and issuing as U.S. Pat. No. 9,548,980 on Jan. 17, 2017, which is a Continuation application of U.S. patent application Ser. No. 13/214,938, filed on Aug. 22, 2011 and issued as U.S. Pat. No. 9,063,652 on Jun. 23, 2015, which is a Continuation-in-Part application of U.S. application Ser. No. 12/990,440, which was filed on Oct. 29, 2010, and issued as U.S. Pat. No. 8,898,588 on Nov. 25, 2014, which is a National Stage of International Application No. PCT/KR2010/003573, filed Jun. 3, 2010, which claims priority to Korean Patent Application Nos. 10-2009-0049798 and 10-2009-0057214 filed on Jun. 5, 2009 and Jun. 25, 2009, respectively, in the Korean Intellectual Property Office, the entire disclosures of each of which of are incorporated herein by reference.

BACKGROUND OF THE INVENTION

1. Field of the Invention

Systems and methods consistent with the present invention relate generally to a method for providing a user interface (UI) for each user, a method for performing a service, and a device applying the same, and more particularly, to a method for providing a UI suitable for a user by recognizing user's approach, a method for performing a service, and a device applying the same.

2. Description of the Related Art

With the development of communication technologies, an environment where various devices are connected to one another via a communication network and provide their respective services to a user is established. For example, a home network system is established in home and a conference room using an office network is established in an office. Also, the government is actively conducting a Ubiquitous (U)-city business which establishes a ubiquitous environment in a city via a network.

A device included in such a network environment is likely to be shared by several users rather than being used by one user. Therefore, a user should go through a user authentication process in order to use a specific device.

However, since the user should go through a process of inputting an ID and a password every time he or she wishes to log in, there is inconvenience in starting use of the device. Also, when the user wishes to use files stored in his or her computer using another device, the user should go through a process of accessing the computer and then copying the files stored in the computer, which also may cause inconvenience.

The user wishes to use the devices in a network environment by performing a simple process. Therefore, there is a need for a method for a user to use devices connected to a network environment more easily.

SUMMARY OF THE INVENTION

An aspect of the present invention is to provide a method for providing a User Interface (UI) for each user, which displays an icon indicating that a user has approached on a screen, if user's approach within an approach recognition area is detected, and displays a personalized area, which is a screen area allocated to the user, if a manipulation to select the icon is input, and a device applying the same.

According to an aspect of the present invention, a method of performing a service in an electronic apparatus. The method includes receiving identifier information from an identifier, if the electronic apparatus is detecting an approach of the identifier; obtaining address information of a service provider based on the identifier information received from the identifier; requesting service information to the service provider based on user information of the electronic apparatus and the address information of the service provider; receiving the service information in response to the request to the service provider; and displaying a received service information on a display of the area based on electronic apparatus.

According to another aspect of the present invention, an electronic apparatus is provided that comprises a display, a communication unit configured to receive identifier information from an identifier, if the electronic apparatus is detecting an approach of the identifier, and a processor configured to control the communication unit to receive the identifier information from the identifier, obtain address information of a service provider based on the identifier information received from the identifier, request service information to the service provider based on user information of the electronic apparatus and the address information of the service provider, receive the service information in response to the request to the service provider, and control the display to display the received service information on the display of the electronic apparatus.

According to the various embodiments, the icon indicating that the user has approached is displayed on the screen, if the user approach within the approach recognition area is detected, and if the manipulation to select the icon is input, the personalized area allocated to the user is displayed. Therefore, the user is able to use devices connected to a network environment more easily. In particular, the user is able to use the device simply by approaching the device without going through an extra log-in process, so that the user can use the device very easily.

Further, a personalized service can be provided when the user approaches to the device only. Furthermore, if the device is used with other users, a connection point can be used for a specific user. Accordingly, a personalized service can be provided per each user without going through complicated processes.

BRIEF DESCRIPTION OF THE DRAWINGS

The above and/or other aspects of the invention will become and more readily appreciated from the following description of certain embodiments the present invention, taken in conjunction with the accompanying drawings, in which.

DETAILED DESCRIPTION OF EMBODIMENTS OF THE INVENTION

Figure 1:
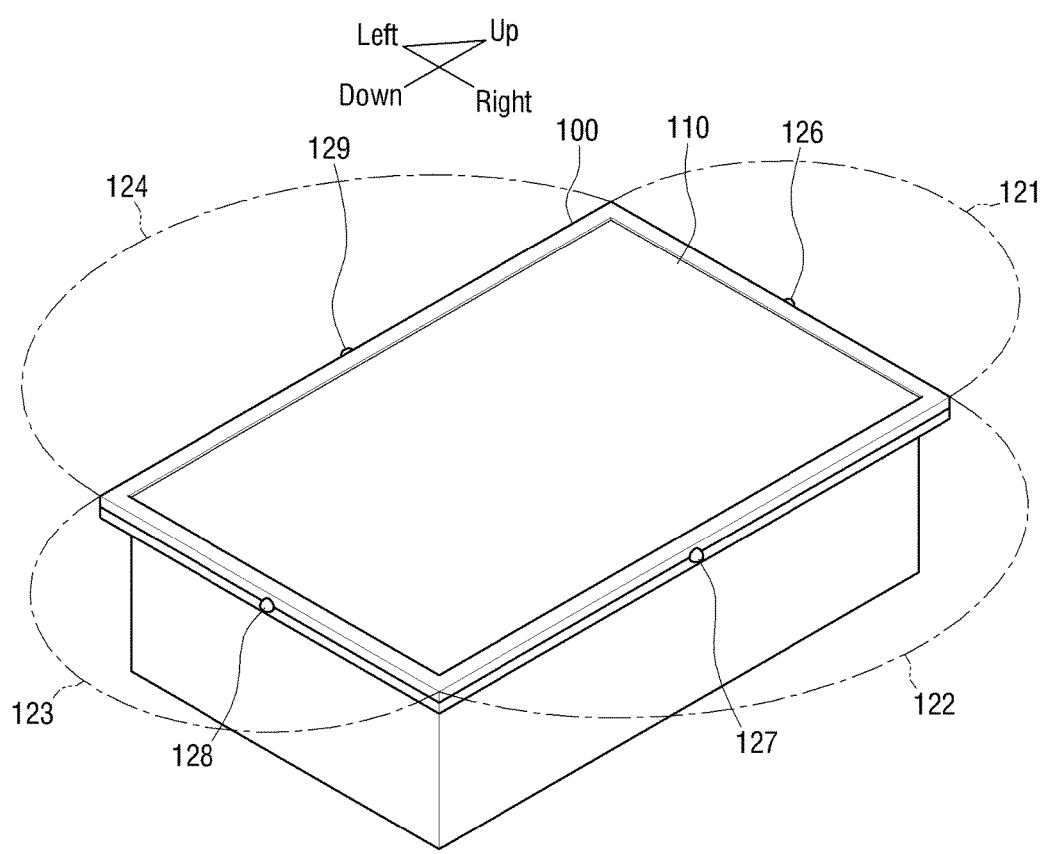
FIG. 1 is a schematic view illustrating a table top according to an embodiment of the present invention.

Reference will now be made in detail to certain embodiments of the present invention, examples of which are illustrated in the accompanying drawings, wherein like reference numerals refer to the like elements throughout. These embodiments are described below in order to explain the present invention by referring to the figures.

FIG. 1 is a schematic view illustrating a table top 100 according to an embodiment of the present invention. As shown in FIG. 1, the table top 100 is a computer device realized in the form of a table and a display 100 is mounted on an upper plate of the table.

The table top 100 recognizes whether or not a user approaches an approach recognition area using an approach recognition unit. The table top 100 has a rectangular shape having four sides. Therefore, the approach recognition unit includes a first approach recognition sensor 126, a second approach recognition sensor 127, a third approach recognition sensor 128, and a fourth approach recognition sensor 129, which are arranged on each of the sides.

The table top 100 recognizes whether or not the user approaches a first area 121, a second area 122, a third area 123, and a fourth area 124 indicating each of the four sides. For example, the first to the fourth areas 121-124 range from 1 m to 1.5 m from a center point of each side. In other words, the approach recognition area refers to an area at which the table top 100 recognizes the user's approach, and includes the first to the fourth areas 121-124 in FIG. 1.

In this application, the first area 121 is defined as having an upper orientation, the second area 122 is defined as having a rightward orientation, the third area 123 is defined as having a lower orientation, and the fourth area 124 is defined as having a left orientation.

User's approach to the first area 121 is detected by the first approach recognition sensor 126, user's approach to the second area 122 is detected by the second approach recognition sensor 127, user's approach to the third area 123 is detected by the third approach recognition sensor 128, and user's approach to the fourth area 124 is detected by the fourth approach recognition sensor 129.

The table top 100 recognizes user's approach using various types of approach recognition units. Specifically, the approach recognition unit may be an ID card reader, a wireless communication module, or a biometric sensor. For example, if the user places his or her ID card on an ID card reader, the table top 100 recognizes user's approach via the ID card reader. Also, if the user carries the ID card, the table top 100 may detect the user's ID card through wireless communication such as radio frequency (RF), Zigbee, or Bluetooth. Also, the table top may recognize user's approach using a biometric sensor using a biometric authentication process of recognizing user's voice, cornea, face or finger print. Also, the table top 100 may recognize who the user is by recognizing user's ID card or user's voice, cornea, face or finger print.

Also, the table top 100 may recognize in which direction the user approaches the table top 100. For example, the table top 100 of FIG. 1 has four sides since the table top 100 has a rectangular shape. Therefore, the table top 100 may recognize which side of the four sides the user approaches.

To achieve this, the table top 100 may include the approach recognition sensors arranged on each of the four sides. For example, the table top 100 of FIG. 1 may include four approach recognition sensors arranged on upper, lower, left, and right sides. The table top 100 may compare magnitudes of signals detected by the approach recognition sensors and recognizes user's approaches at a side from which the strongest signal is detected.

As described above, the table top 100 recognizes whether the user approaches or not and recognizes in which direction the user approaches using the approach recognition unit.

Hereinafter, an operation of the table top 100 if the user approaches will be explained with reference to FIGS. 2 to 6.

Figure 2:
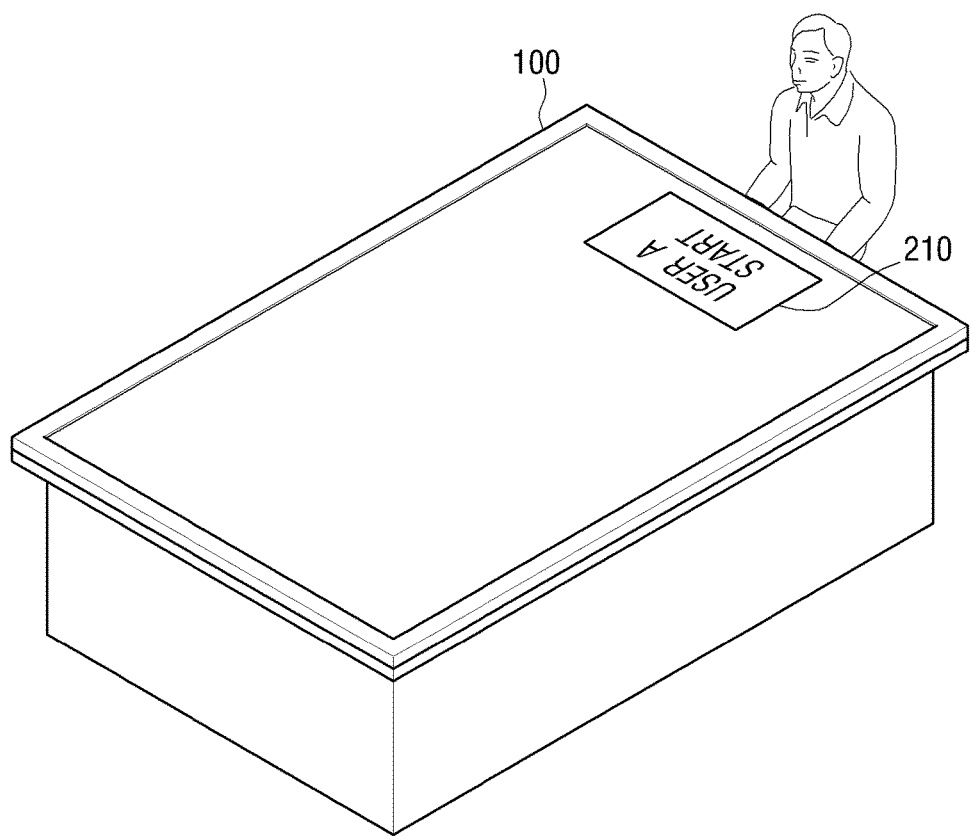
FIG. 2 is view illustrating a user approach recognition icon displayed on a table top, if the table top recognizes user's approach and also recognize user information, according to an embodiment of the present invention.

FIG. 2 is a view illustrating a user approach recognition icon 210 displayed, if the table top 100 recognizes user's approach and recognizes user information, according to an embodiment of the present invention.

As shown in FIG. 2, if the user approaches the upper side of the table top 100, the table top 100 recognizes that the user has approached the upper side and displays the user approach recognition icon 210 on an upper portion of the screen.

Also, the table top 100 may recognize user information along with the user's approach. As shown in FIG. 2, "USER A" is written on the user approach recognition icon 210 displayed on the screen of the table top 100. In other words, the table top 100 recognizes that the user "A" has approached.

The user information recited herein refers to information regarding a user and includes at least one of user's ID, password, name, and photo.

The user approach recognition icon 210 refers to an icon that is displayed on the screen to represent that the table top 100 has recognized that the user approached the table top 100. If the user selects the user approach recognition icon 210 displayed on the screen, the table top 100 determines that the user has approached in order to use the table top 100. In other words, the table top 100 discriminates between an intended approach having an intention to use the table top 100 and an accidental approach having no intention to use the table top 100, using the user approach recognition icon 210.

The user approach recognition icon 210 is displayed as an icon on a Graphic User Interface (GUI) and displayed along with at least one piece of user information. For example, the user approach recognition icon 210 is displayed along with at least one of user's ID, name, and photo image.

On the other hand, if the table top 100 is not able to recognize who the user is, the table top 100 recognizes the user as a guest. This will be explained with reference to FIG. 3.

Figure 3:
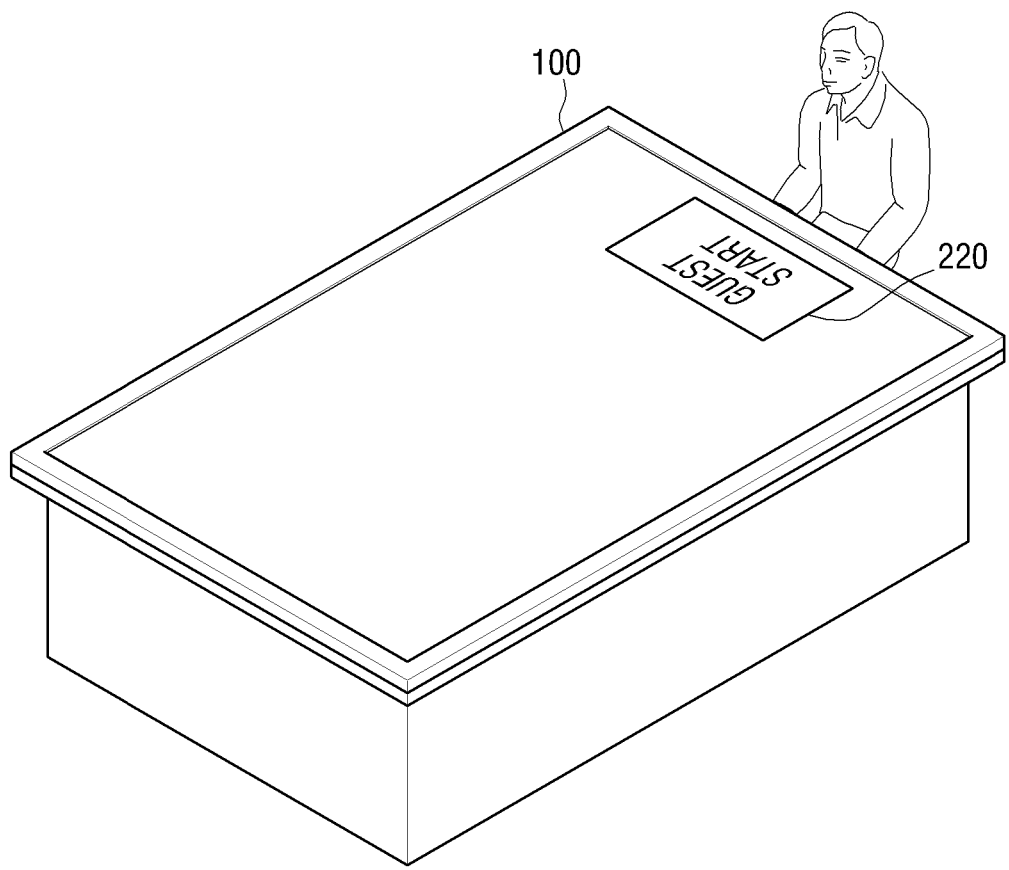
FIG. 3 is a view illustrating a user approach recognition icon displayed on a table top, if the table tope recognizes user's approach but does not recognize user information, according to an embodiment of the present invention.

FIG. 3 is a view illustrating a user approach recognition icon 220 displayed, if the table top 100 recognizes user's approach but does not recognize user information, according to an embodiment of the present invention.

As shown in FIG. 3, if the table top 100 recognizes user's approach only and does not recognize user information, "GUEST" is displayed on the user approach recognition icon 220.

Also, if the table top 100 does not recognize the user information, the table top 100 may receive the user information directly from the user. Specifically, if the table top 100 does not recognize the user information, the table top 100 displays a user information input screen. If user information is input by the user, the table opt 100 stores the input user information and displays an input user's ID on the user approach recognition icon 220.

Figure 4:
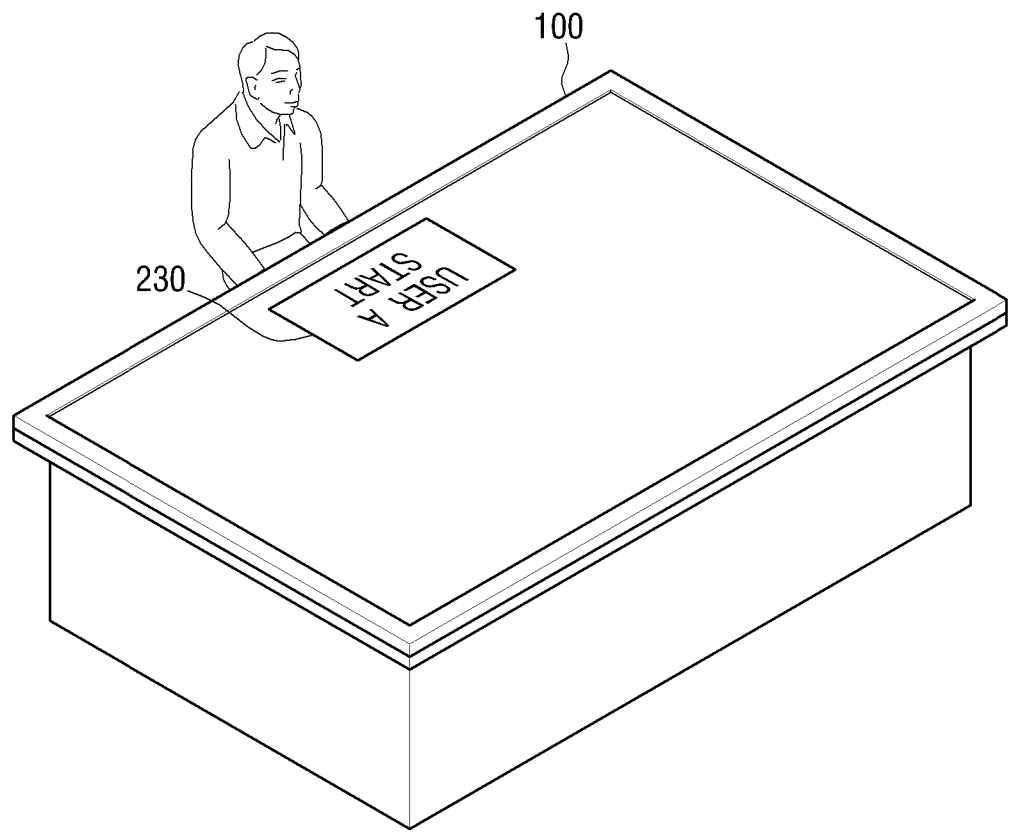
FIG. 4 is a view illustrating a user approach recognition icon displayed on table top, if a user approaches a left side of the table top, according to an embodiment of the present invention.

Also, the user approach recognition icon 220 may be displayed in various positions. This will be explained with reference to FIG. 4. FIG. 4 is a view illustrating a user approach recognition icon 230 displayed, if the user approaches a left side of the table top 100.

The table top 100 displays the user approach recognition icon 230 in a different position according to a direction in which the user approaches. In other words, the table top 100 displays the user approach recognition icon 230 on a screen area facing the approaching direction of the user. The user approach recognition icon 230 is displayed on the screen area close to the position the user has approached, so that the user can recognize the user approach recognition icon 230 easily.

Accordingly, as shown in FIG. 4, if the user approaches the left side of the table top 100, the user approach recognition icon 230 is displayed on the left portion of the screen.

As described above, the table top 100 displays the user approach recognition icon on a portion close to the approaching direction of the user. Therefore, the user is able to recognize intuitively that the user approach recognition icon is displayed due to his or her approach.

In this embodiment, the table top 100 displays the user approach recognition icon 230 in order to inform the user's approach. However, any other means for informing the user's approach may be used. Specifically, the means for informing the user's approach may be realized as a light emitting element or a sound. The light emitting element serving as the means for informing the user's approach will be explained below with reference to FIG. 5.

Figure 5:
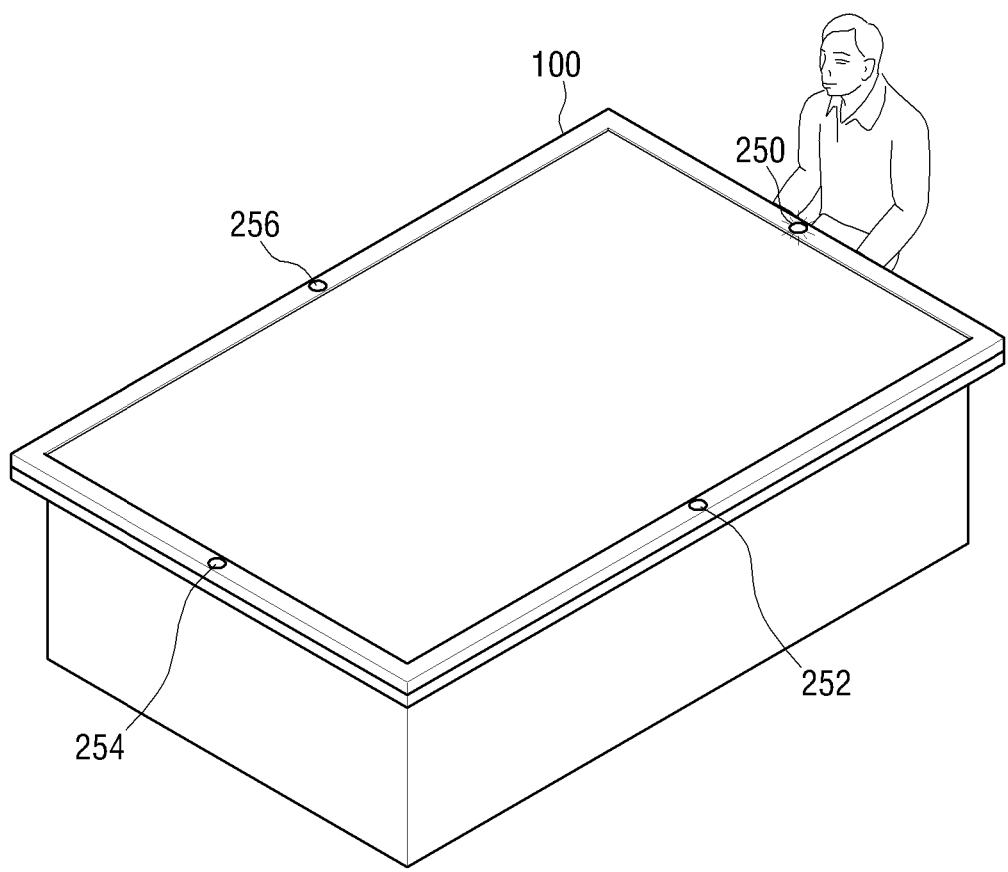
FIG. 5 is a view illustrating a table top which has a light emitting element as a means for alarming user's approach according to an embodiment of the present invention.

FIG. 5 is a view illustrating the table top 100 which uses a light emitting element as a means for informing user's approach according to an embodiment of the present invention. As shown in FIG. 5, the table top 100 includes a first light emitting element 250, a second light emitting element 252, a third light emitting element 254, and a fourth light emitting element 256, which are arranged on each of side surfaces of the table top 100.

If the user approaches the table top 100, the table top 100 controls a light emitting element on a surface from which user's approach is detected to emit light. In FIG. 5, since the user approaches the upper side of the table top 100, the table top 100 controls the first light emitting element 250 arranged on the upper side surface to emit light.

As described above, the table top 100 is able to inform of recognition of the user's approach using the light emitting element.

Figure 6:
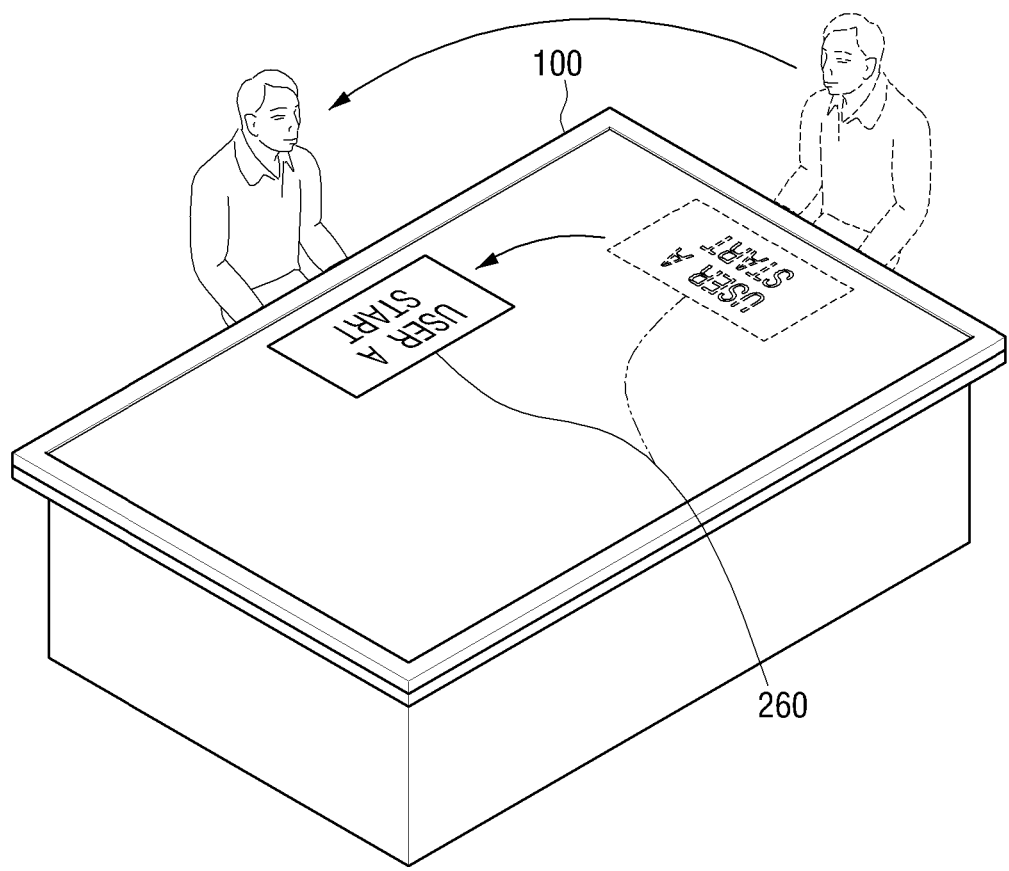
FIG. 6 is a view illustrating a user approach recognition icon which is moved on a table top, if a user moves from one position to another position, according to an embodiment of the present invention.

FIG. 6 is a view illustrating a user approach recognition icon 260 which is moved over the table top 100, if a user moves from one position to another position, according to an embodiment of the present invention. As shown in FIG. 6, if the user stands the upper side of the table top 100 and moves to the left side, the user approach recognition icon 260 is moved from the upper portion of the screen to the left portion. In other words, if the user moves from one position to another position, the table top 100 moves the user approach recognition icon 260 to a position to which the user has moved.

Also, the table top 100 moves the user approach recognition icon 260 such that a lower end of the user approach recognition icon 260 is oriented toward an outside of the screen while the user approach recognition icon 260 is being moved according to the position to which the user has moved. If the user approach recognition icon 260 is moved from the upper portion to the left portion on the screen as shown in FIG. 6, the orientation of the user approach recognition icon 260 on the screen changes from an upper direction to a left direction so that the lower end of the user approach recognition icon 260 is always oriented toward the outside of the screen. Therefore, wherever the user moves, the user is able to see the user approach recognition icon 260 being oriented in a normal direction rather than in a reverse direction or a wrong direction.

As described above, since the table top 100 moves the user approach recognition icon 260 displayed on the screen according to the changed position of the user, the user is able to touch the user approach recognition icon 260 more easily.

Figure 7:
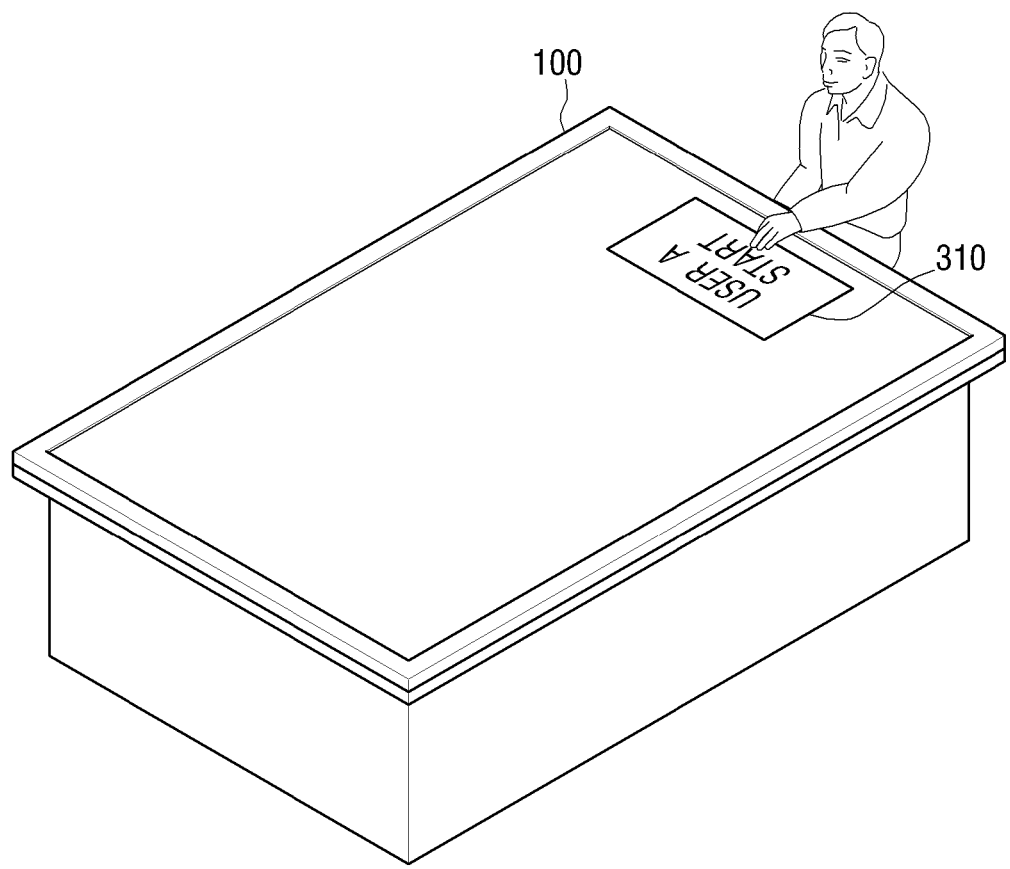
FIG. 7 is a view illustrating that a user touches a user approach recognition icon according to an embodiment of the present invention.

Hereinafter, a personalized area will be explained with reference to FIGS. 7 to 9. FIG. 7 is a view illustrating that the user touches a user approach recognition icon 310 according to an embodiment of the present invention.

If the table top 100 displays the user approach recognition icon 310 to inform of the recognition of user's approach, the user is able to use the table top 100 by selecting the user approach recognition icon 310 displayed on the screen. In other words, if the user selects the user approach recognition icon 310, the table top 100 displays a menu suitable for the user on the screen. For example, if the screen of the table top 100 is a touch screen, the user is able to start to use the table top 100 by touching the user approach recognition icon 310.

Figure 8:
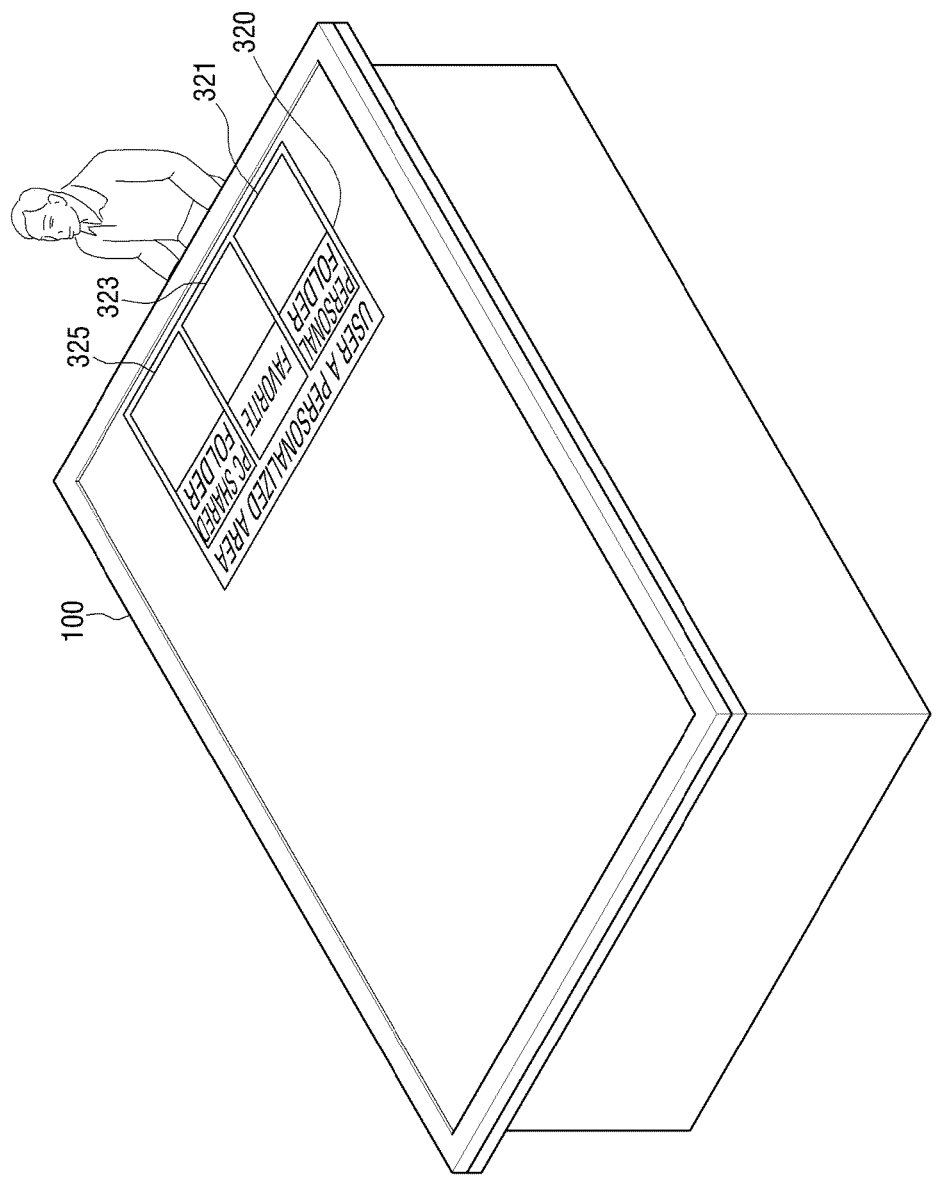
FIG. 8 is a view illustrating a personalized area which is displayed on a screen according to an embodiment of the present invention.

FIG. 8 is a view illustrating a personalized area 320 which is displayed on the screen according to an embodiment of the present invention. As shown in FIG. 8, if the user touches the user approach recognition icon on the table top 100, the table top 100 displays the personalized area 320, which is a screen area usable by the user, on the screen. The table top 100 displays the personalized area 320 on a screen area corresponding to an approaching direction of the user. The table top 100 displays the personalized area 320 on the screen area close to the user so that the user can use the personalized area 320 more easily.

The personalized area 320 refers to a screen area that is allocated to the user so that the user can user the personalized area 320 on the screen. Also, the remaining area of the screen of the table top 100 except for the personalized area 320 is a sharing area that is shared by all of the users. The personalized area 320 displays a menu suitable for private use of the user.

For example, the personalized area 320 displays user's personal folders stored in the table top 100, shared folders of a user's personal computer, a user's blog over the Internet, and a list of friends connected to the network.

Also, the personalized area 320 may automatically display an application having the highest rate of use in each time slot. In this case, the table top 100 determines which application is used by the user in each time slot, by referring to user's log with respect to each application. For example, if the user checks an e-mail on the table top 100 at 3 p.m. every Wednesday, the table top 100 displays an icon for executing a mail application on the personalized area 320 at 3 p.m.

In FIG. 8, the personalized area 320 displays menus of a personal folder 321, a favorite 323, and a PC shared folder 325. However, any other menu usable by the user can be displayed on the personalized area 320.

As described above, since the table top 100 displays the personalized area 320 for each user, the user is able to use his or her private area on the table top 100.

Figure 9:
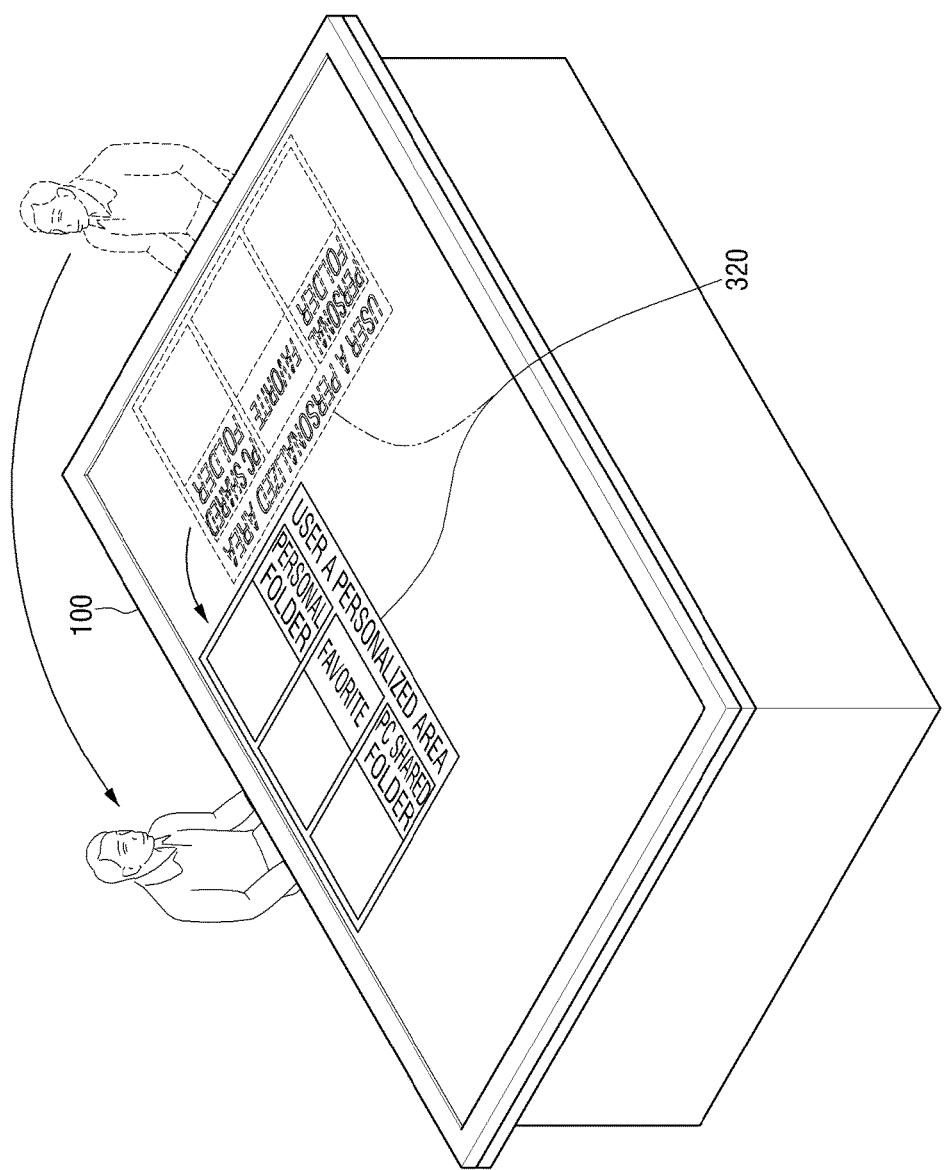
FIG. 9 is a view illustrating a personalized area which is moved, if a user moves from one position to another position, according to an embodiment of the present invention.

FIG. 9 is a view illustrating the personalized area 320 which is moved on the table top 100, if the user moves from one position to another position, according to an embodiment of the present invention. As shown in FIG. 9, if the user stands at the upper side of the table top 100 and moves to the left side, the personalized area 320 is moved from the upper portion of the screen to the left portion. In other words, if the user moves from one position to another position, the table top 100 moves the personalized area 320 to the position to which the user has moved.

Also, the table top 100 moves the personalized area 320 such that a lower end of the personalized area 320 is oriented toward an outside of the screen while the personalized area 320 is being moved according to the position to which the user has moved. If the personalized area 320 is moved from the upper portion to the left portion on the screen as shown in FIG. 9, the orientation of the personalized area 320 on the screen changes from an upper direction to a left direction so that the lower end of the personalized area 320 is always oriented toward the outside of the screen. Therefore, wherever the user moves, the user is able to see the personalized area 320 being oriented in a normal direction rather than in a reverse direction or a wrong direction.

As described above, since the table top 100 moves the personalized area 320 according to the changed position of the user, the user is able to use the personalized area 320 more easily.

Figure 10:
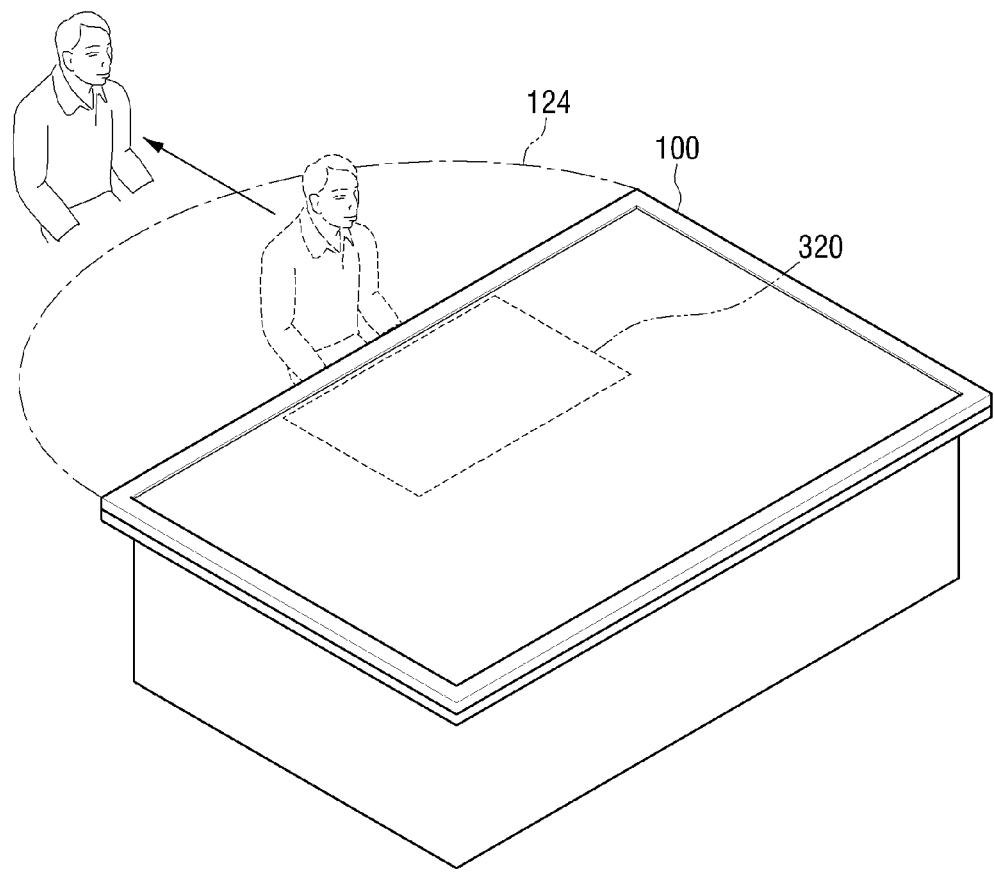
FIG. 10 is a view illustrating that a personalized area disappears, if a user gets out of a fourth area of a table top, according to an embodiment of the present invention.

Hereinafter, a method of terminating the use of the table top 100 will be explained with reference to FIG. 10. FIG. 10 is a view illustrating that the personalized area 320 disappears, if the user gets out of the fourth area 124 of the table top 100.

As shown in FIG. 10, if the user gets out of the fourth area 124, the approach recognition unit of the table top 100 no longer recognizes user's approach. Accordingly, the table top 100 determines that the user wishes to end the use of the table top 100 and makes the personalized area 320 disappear.

Also, even if the user gets out of the fourth area 124, the table top 100 may have a predetermined standby time. In other words, even if the user gets out of the fourth area 124 but returns to the fourth area 124 within the standby time, the table top 100 continues displaying the personalized area 320 on the screen. On the other hand, if the standby time elapses after the user gets out of the fourth area 124, the table top controls the personalized area 320 to disappear.

Even if the user gets out of the fourth area 124, the table top 100 stores information regarding the personalized area 320 in a memory during the standby time. Accordingly, if the user re-approaches the fourth area 124 within the standby time, the table top 100 displays the personalized area 320 which has been used previously. Therefore, even if the user gets out of the fourth area 124 by mistake, the user is able to use the table top 100 again more easily.

In FIG. 10, only the fourth area 124 has been explained as an example of the approach recognition area. However, any other approach recognition area may be applied. For example, the first area 121, the second area 122, and the third area 123 of FIG. 1 may be applied.

Until now, the method for providing the UI for each user by recognizing the user's approach and providing the personalized area has been described with reference to FIGS. 1 to 10.

In the above embodiment, the table top 100 is used by one user. However, the table top 100 may be used by a plurality of users. In this case, the table top 100 allocates a personalized area to each user and displays the personalized area for each user. This will be explained with reference to FIG. 11.

Figure 11:
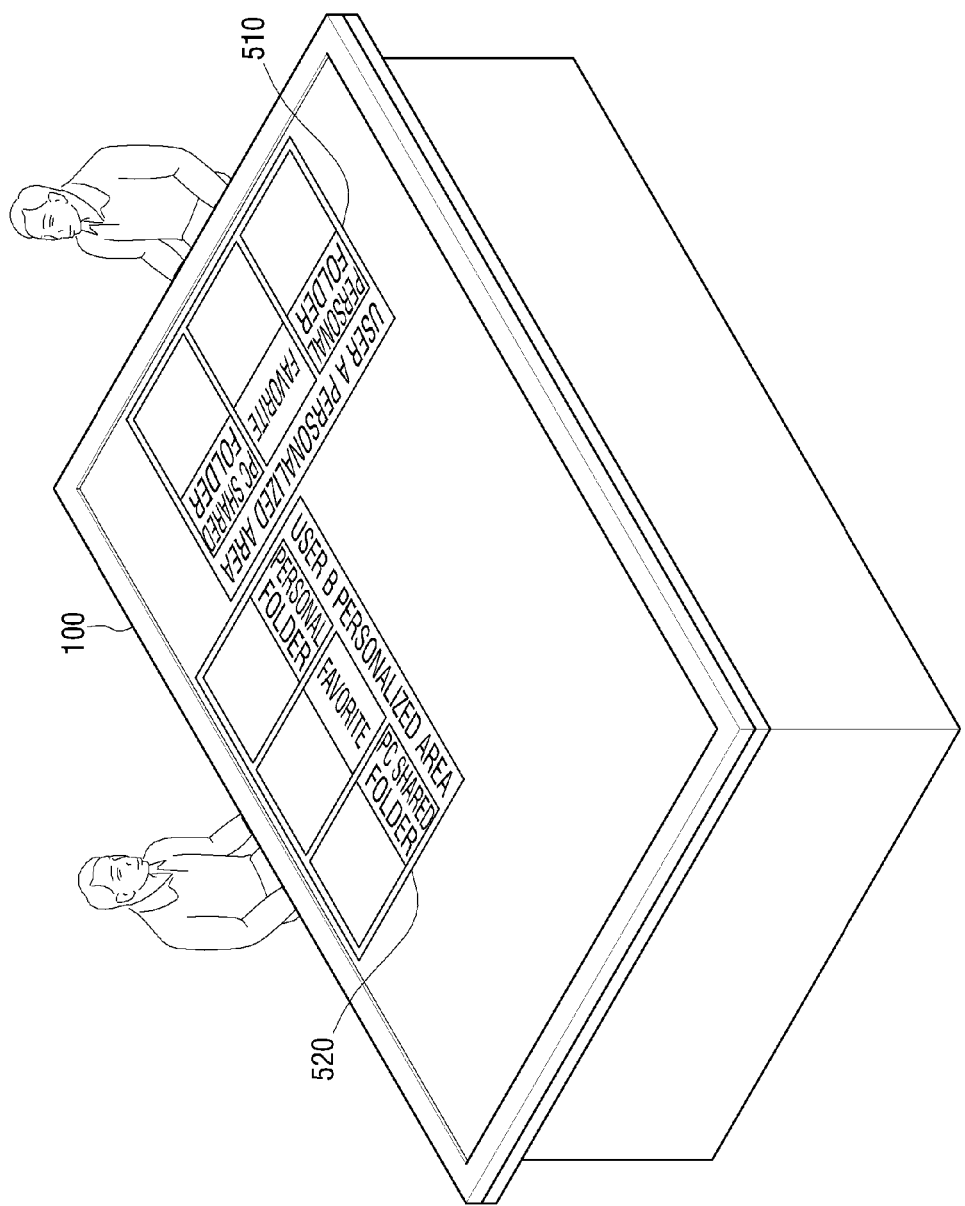
FIG. 11 is a view illustrating a table top which is used by two users according to an embodiment of the present invention.

FIG. 11 is a view illustrating the table top 100 which is used by two users according to an embodiment of the present invention. As shown in FIG. 11, the table top 100 displays a personalized area 510 for a user A and a personalized area 520 for a user B. As described above, the table top 100 may be used by two or more users simultaneously. The table top 100 displays a user approach recognition icon and a personalized area for each user.

Also, the table top 100 may exchange users' data through the users' respective personalized areas. For example, if the user A drags a file displayed on his or her personalized area 510 into the personalized area 520 of the user B, the top table 100 may copy the file from the personalized area 510 of the user A to the personalized area 520 of the user B.

In the above embodiment, one table top 100 is provided. However, two or more table tops communicably connected to each other may be applied. This will be explained with reference to FIG. 12.

Figure 12:
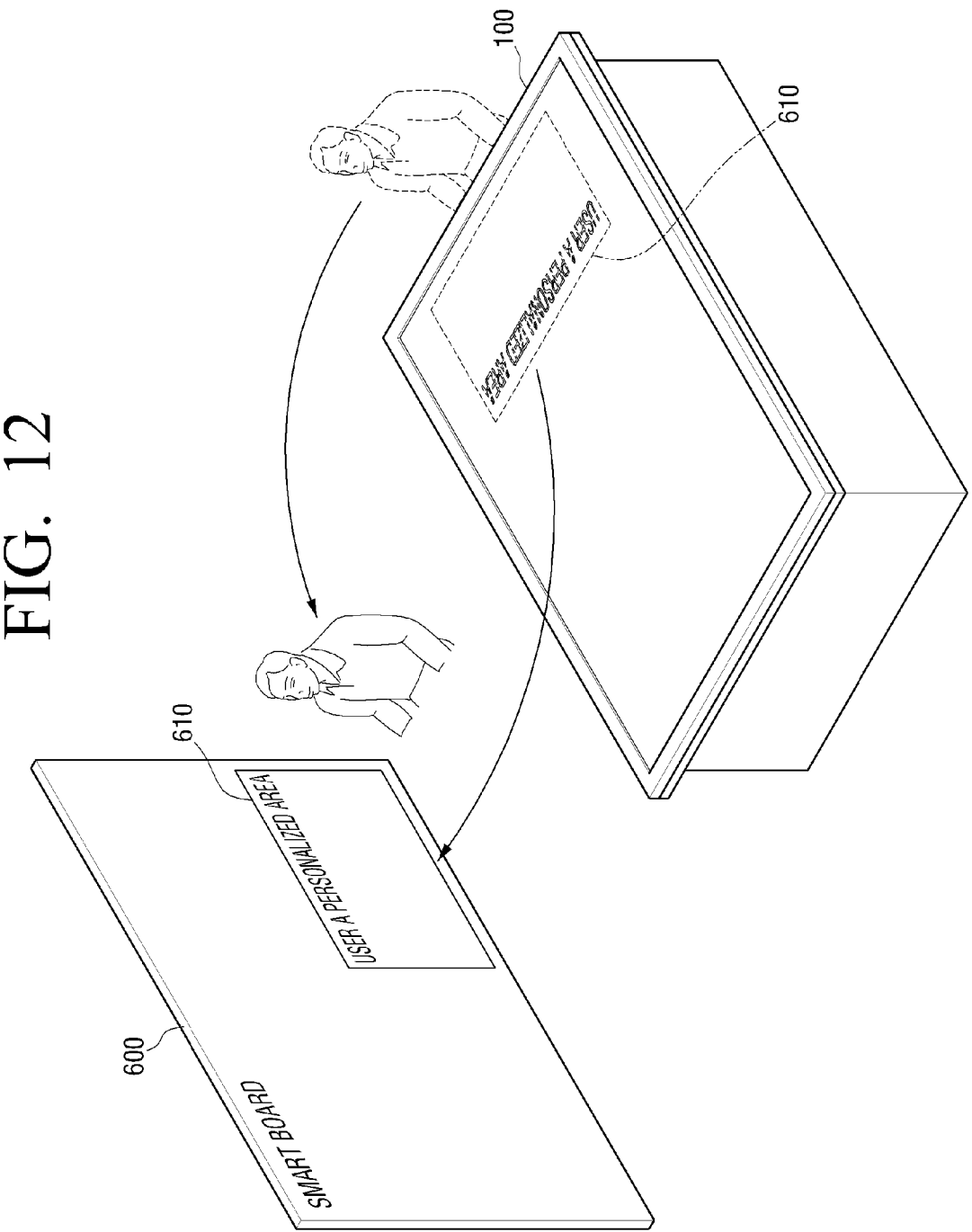
FIG. 12 is a view illustration a smart board 600 and a table top 100 which cooperate with each other according to an embodiment of the present invention.

FIG. 12 is a view illustrating a smart board 600 and a table top 100 which cooperate with each other according to an embodiment of the present invention. As shown in FIG. 12, the smart board 600 and the table top 100 are communicably connected to each other via a wired or wireless communication module. Also, the smart board 600 is also capable of recognizing user's approach.

If the user moves from the table top 100 to the smart board 600, the table top 100 transmits information regarding a user's personalized area 610 to the smart board 600. If the smart board 600 recognizes user's approach, the smart board 600 displays the personalized area 610 using the information regarding the user's personalized area 610 received from the table top 100.

As described above, the table top 100 cooperates with another device communicably connected thereto by transmitting information regarding a personalized area. Also, the table top 100 may cooperate with another device communicably connected thereto by transmitting not only the information regarding the personalized area but also information regarding a user approach recognition icon.

In the above embodiment, the table top 100 has a rectangular shape. However, the table top 100 may have any other shape such as a circular shape or a hexagonal shape. Also, the number of approach recognition sensors arranged on the table top 100 and the arrangement thereof are not limited.

Also, in the above embodiment, the table top 100 has been described as a device to which the present invention is applied. However, any device that can recognize user's approach and provide a personalized area can be applied. For example, the device may be a smart board or a TV besides the table top 100.

Figure 13:
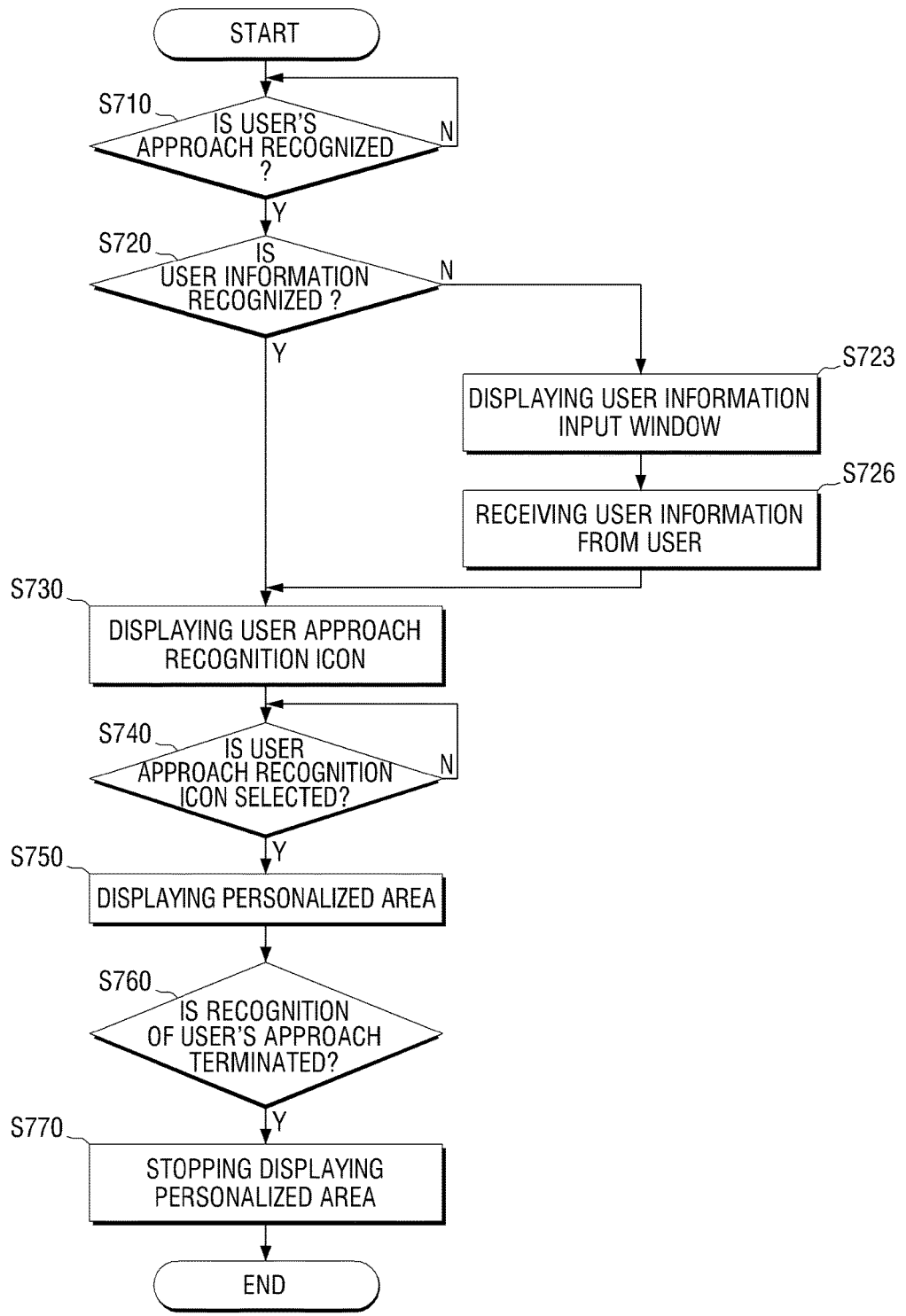
FIG. 13 is a flowchart illustrating a method for providing a UI for each user according to an embodiment of the present invention.

Hereinafter, a method for providing a UI for each user of the device described above with reference to FIGS. 1 to 12 will be explained in detail with reference to FIG. 13. FIG. 13 is a flowchart illustrating a method for providing a UI for each user according to an embodiment of the present invention. In FIG. 13, the device is the table top 100.

The table top 100 determines whether user's approach is recognized or not (S710). The method of recognizing user's approach has been described with reference to FIG. 1.

If the user's approach is recognized (S710-Y), the table top 100 determines whether it is possible to recognize user information or not (S720). If the user information is recognized (S720—Y), the table top 100 displays a user approach recognition icon on the screen as shown in FIG. 2 (S730).

On the other hand, if the user information is not recognized (S710—N), the table top 100 displays a user information input window (S723). The table top 100 receives the user information from the user (S726). After that, the table top 100 displays a user approach recognition icon regarding the user on the screen with reference to the input user information.

As shown in FIG. 4, the user approach recognition icon is displayed at a different position on the screen according to a user's position. Also, as shown in FIG. 6, if the user moves from one position to another position, the table top 100 moves the user approach recognition icon according to the position to which the user has moved.

If the user information is not recognized (S710—N), the table top 100 may display a guest user approach recognition icon as shown in FIG. 3 so that the user can use the table top 100 as a guest without going through a user authentication process.

After that, the table top 100 determines whether the user approach recognition icon is selected or not (S740). The user may select the user approach recognition icon using a manipulating device provided on the table top 100. For example, as shown in FIG. 7, the user may select the user approach recognition icon by touching it.

If the user selects the user approach recognition icon 740, the table top 100 displays a personalized area for the user on the screen. As shown in FIG. 8, various menus are displayed on the personalized area so that the user can use the menus. Also, as shown in FIG. 9, the personalized area may be moved according to the user's movement.

After that, the table top 100 determines whether the user's approach recognition is terminated or not (S760). As shown in FIG. 10, if the user gets out of the approach recognition area, the table top 100 determines that the user's approach recognition is terminated.

If the user's approach recognition is terminated (S760-Y), the table top 100 stops displaying the personalized area (S770).

Through the above-described process, the table top 100 recognizes the user's approach and provides the UI for each user. In particular, since the table top 100 recognizes the user by recognizing the user's approach only, the user is able to use a personalized service without a complicated log-in process.

Figure 14:
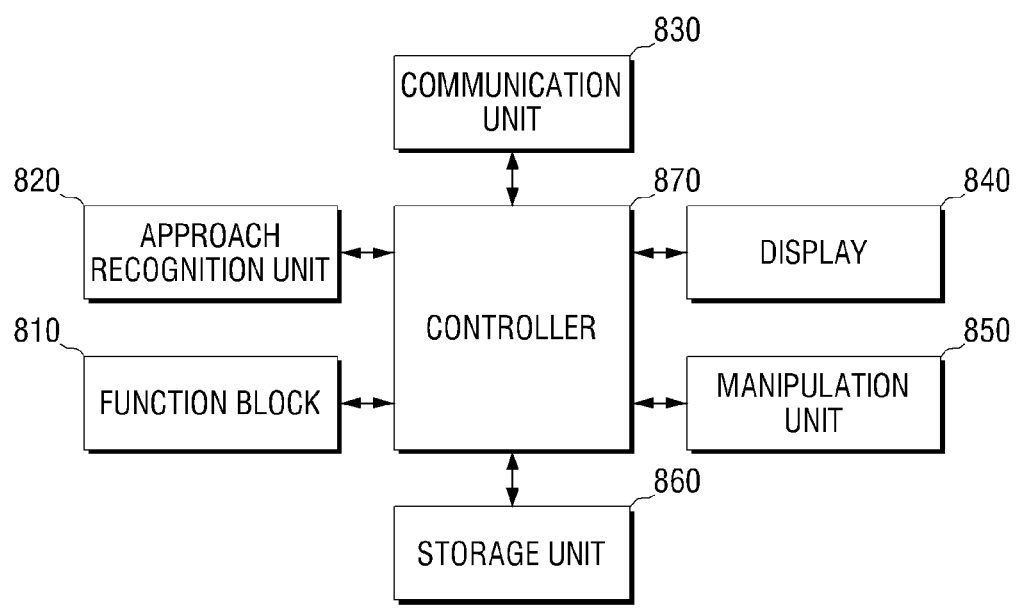
FIG. 14 is a block diagram illustrating a device according to an embodiment of the present invention.

FIG. 14 is a block diagram illustrating a device according to an embodiment of the present invention. As shown in FIG. 14, the device includes a function block 810, an approach recognition unit 820, a communication unit 830, a display 840, a manipulation unit 850, a storage unit 860, and a controller 870.

The function block 810 performs an original function of the device. If the device is a table top, the function block 810 performs a table top function, and if the device is a smart board, the function block 810 performs a function of the smart board which is needed in a digital conference.

The approach recognition unit 820 recognizes whether the user approaches an approach recognition area or not. The approach recognition unit 820 includes at least one approach recognition sensor. The number of approach recognition sensors is different according to a type of sensor and arrangement of sensors. For example, the approach recognition unit 820 may use an ID card reader, a wireless communication module, or a biometric sensor.

The approach recognition unit 820 may recognize in which direction the user approaches the device. The approach recognition unit 820 may recognize the approaching direction of the user using a location where the approach recognition sensor is arranged.

As described above, the device recognizes whether the user approaches or not and in which direction the user approaches, using the approach recognition unit 820. The function of the approach recognition unit 820 has been described above with reference to FIG. 1 and thus an overlapped explanation is omitted.

The communication unit 830 communicates with surrounding devices by accessing a network configured along with the surrounding devices.

The display 840 displays a result of performing the function of the function block 810. Also, the display 840 displays a GUI necessary for realizing the present invention. More specifically, the display 840 displays the user approach recognition icon and the personalized area.

The manipulation unit 850 is a means for inputting a user command. For example, the manipulation unit 850 includes a touch screen and a button provided on the device.

The storage medium 860 is a storage medium that stores files, contents, and data used for performing a service. Also, the storage medium 860 stores information of a user's ID and information of a user's personalized area.

Also, the controller 870 performs the operations of the flowchart of FIG. 13, thereby recognizing the user's approach and displaying the personalized area.

In the above embodiment, one user uses one side of the table top 100. However, the table top 100 may recognize two or more users approaching one side. This will be explained with reference to FIGS. 15 and 16.

Figure 15:
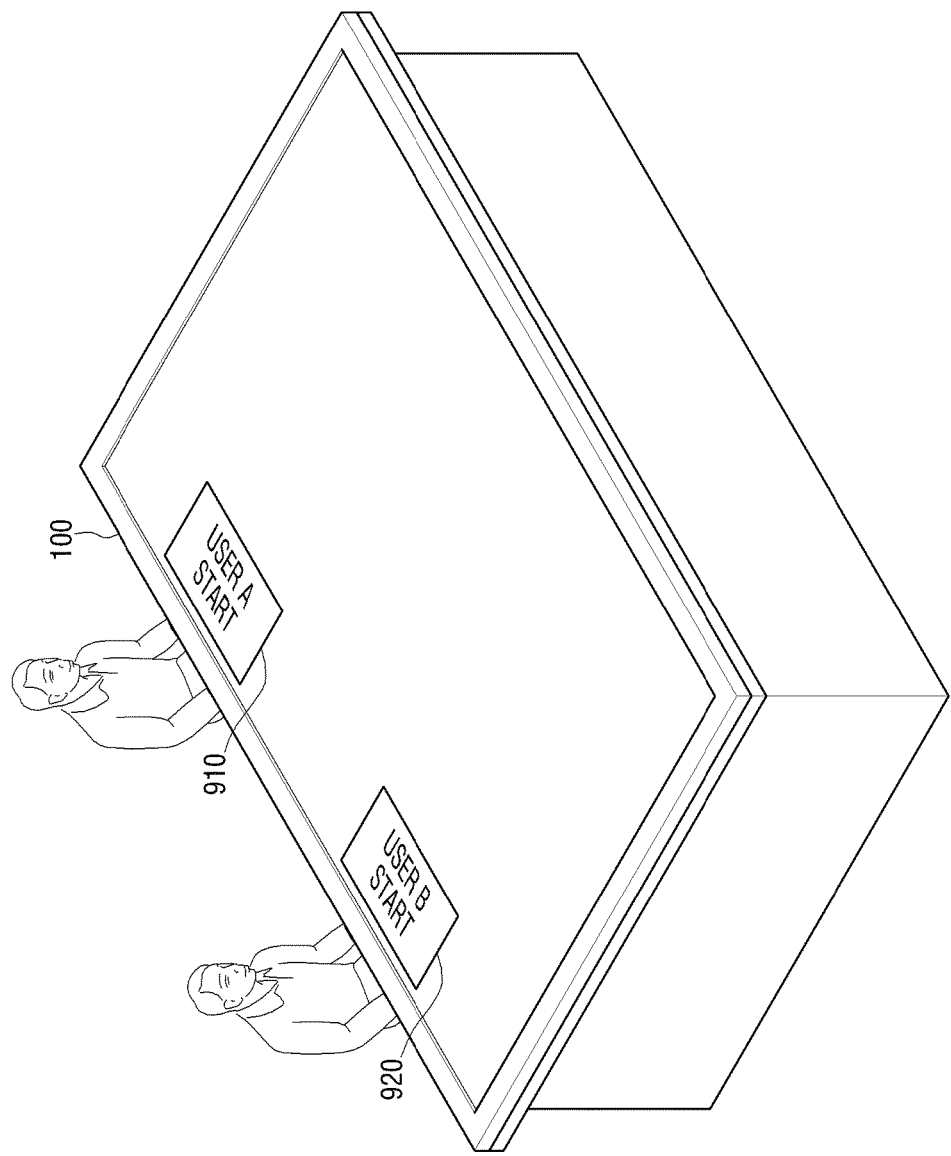
FIG. 15 is a view illustrating user approach recognition icons displayed if two users approach one side of a table top, according to an embodiment of the present invention.

FIG. 15 is a view illustrating user approach recognition icons displayed if two users approach one side of the table top 100, according to an embodiment of the present invention. As shown in FIG. 15, if two users approach one side of the table top 100, the table top 100 recognize two users' approaches. The table top 100 recognizes whether a plurality of users approach the approach recognition area or not. Recognizing approaches of the plurality of users may be performed by a single approach recognition sensor or a plurality of approach recognition sensors. For example, the table top 100 recognizes ID cards of two or more users to recognize two or more users' approaches. Also, the table top 100 may recognize the plurality of users approaching one side using a plurality of biometric sensors arranged on the one side.

The table top 100 displays an approach recognition icon for each of the two users. For example, as shown in FIG. 15, the table top 100 displays a first approach recognition icon 910 for a user A and a second approach recognition icon 920 for a user B.

As described above, if the two or more users approach one side, the table top 100 displays the approach recognition icon for each user on the screen.

Figure 16:
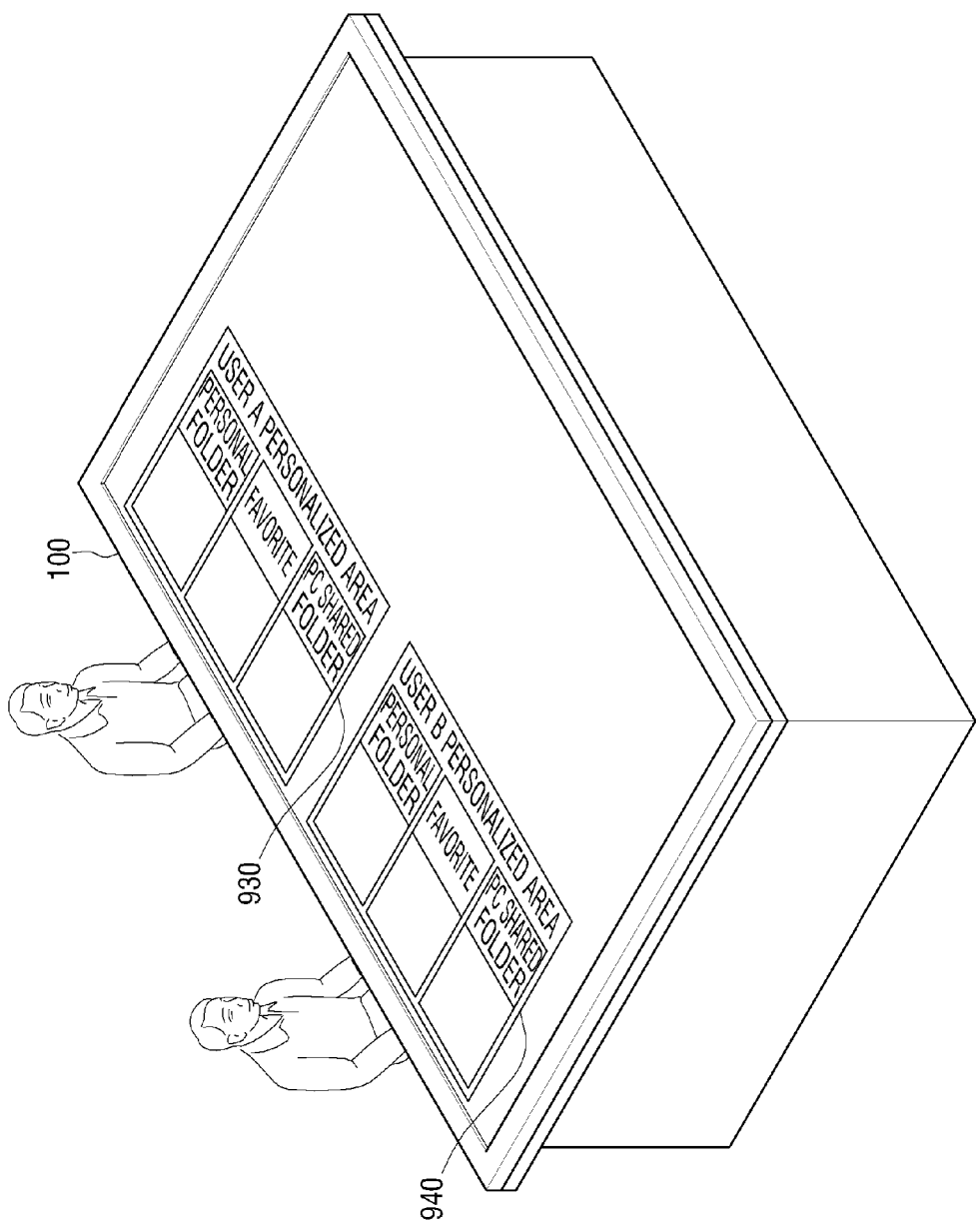
FIG. 16 is a view illustrating personalized areas displayed, if two users approach one side of a table top, according to an embodiment of the present invention.

Also, if two or more users approach one side, the table top 100 may display users' personalized areas on one surface. This will be explained with reference to FIG. 16. FIG. 16 is a view illustrating personalized areas displayed, if two users approach one side of the table top 100, according to an embodiment of the present invention.

If each user of FIG. 15 touches the approach recognition icons, the table top 100 displays a personalized areas for each user on the screen. FIG. 16 illustrates a resulting screen if the two users touch the approach recognition icons. If the two users of FIG. 15 touch the first approach recognition icon 910 and the second approach recognition icon 920, the table top 100 displays a first personalized area 930 for the user A and a second personalized area 940 for the user B as shown in FIG. 16. In other words, if a manipulation to select one of a plurality of approach recognition icons is input, the table top 100 displays a personalized area corresponding to the selected icon.

As described above, if two or more users approach one side, the table opt 100 displays the personalized area for each user.

As described above, the table top 100 is able to recognize the plurality of users approaching one side and provide the approach recognition icon and the personalized area for each user.

Figure 17:
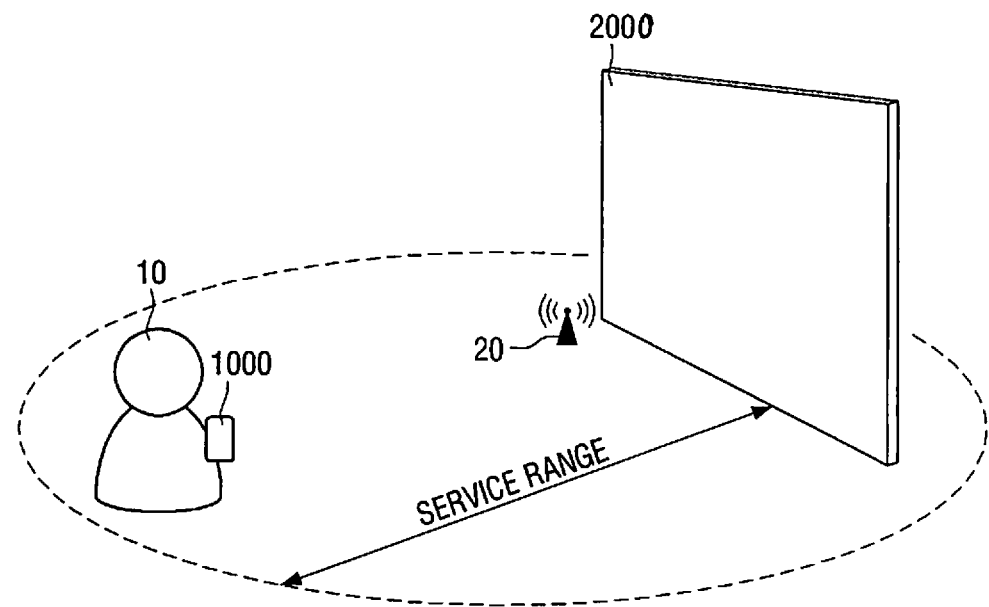
FIG. 17 illustrates a method for performing a service according to an embodiment of the present invention.

FIG. 17 illustrates a method for performing a service according to an embodiment of the present invention.

Referring FIG. 17, a method for performing a service according to an embodiment of the present invention can be performed though the interactions of a device 1000, an identifier 20, and a service provider 2000. The device 1000 is an object that can receive a service from the service provider 2000 through the identifier 20. For example, the device 1000 can be a user terminal device, such a stationary, movable, or mobile device.

Specifically, the device 1000 detects ambient services from the information received from the identifier 20 and determines the distance to the identifier 20, e.g., using the signal strength of the received information, to provide a user with a service.

The identifier 20 transmits the information and signals for the device 1000 to detect and determine an approach. For example, the identifier may be an Access Point (AP), an Ad-hoc device, etc.

The service provider 2000 defines and provides a service and functions for providing service information defined in the device 1000. For example, the service provider 2000 may be a smart Television (TV), an electronic blackboard, a Personal Computer (PC), a Desktop PC, a Notebook PC, a Tabletop display, a Smart Board, a Large Format Display Device, a Mobile Device, a Tablet, etc.

Figure 18:
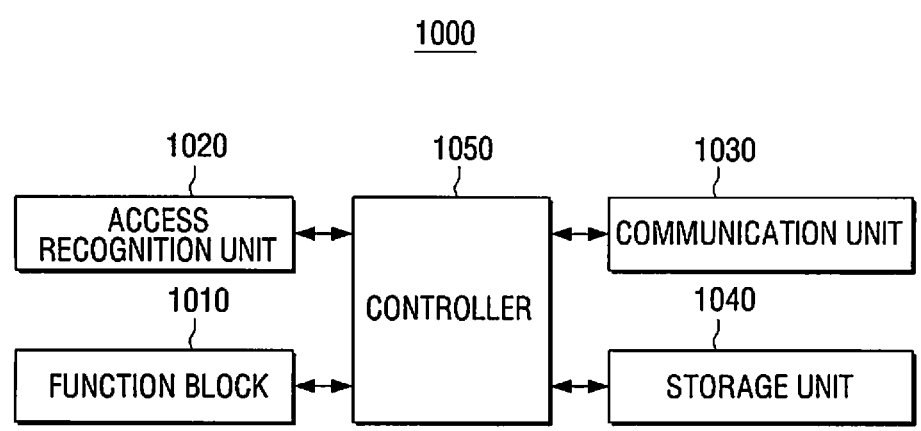
FIG. 18 is a block diagram illustrating a device according to an embodiment of the present invention.

FIG. 18 is a block diagram illustrating a device according to an embodiment of the present invention.

Referring to FIG. 18, the device 1000 includes a function block 1010, an approach (or access) recognition unit 1020, a communication unit 1030, a storage unit 1040, and a controller 1050.

The function block 1010 performs the original function of the device. For example, when the device is a Smart TV, the function block 1010 functions as a Smart TV, and when the device is an electronic blackboard, the function block 1010 functions as a smart board required for a digital conference. As described above, the device 1000 may be a kiosk, an electronic blackboard, a Desktop PC, a Notebook PC, a Tabletop display, a Smart Board, a Large Format Display Device, a Mobile Device, a Tablet, etc., and therefore, the function block 1010 can perform different functions accordingly.

The approach recognition unit 1020 detects whether the identifier 20 approaches the approach recognition area and includes at least one approach recognition sensor. The number of approach recognition sensors varies according to the type and the disposition of the sensor. For example, the approach recognition unit 1020 can be an ID card reader, a wireless communication module, or a human detecting sensor.

The communication unit 1030 communicates with peripheral devices by accessing the network configured with the peripheral devices. Specifically, the communication unit 1030 receives the identifier information from the identifier 20.

The storage unit 1040 is a storage medium where files, contents, and other data used to perform a service are stored. For example, the storage unit 1040 can store a mapping table between the identifier information and the address of the service provider.

The controller 1050 controls the overall operations of the device 1000.

When the approach recognition unit 1020 detects that the identifier 20 approaches the approach recognition area, the controller 1050 can control the communication unit 1030 to receive the identifier information from the identifier 20.

The controller 1050 can obtain the address of the service provider based on the identifier information received from the communication unit 1030 and can control the device 1000 to receive a service from the service provider 2000 based on the obtained address of the service provider.

Figure 19:
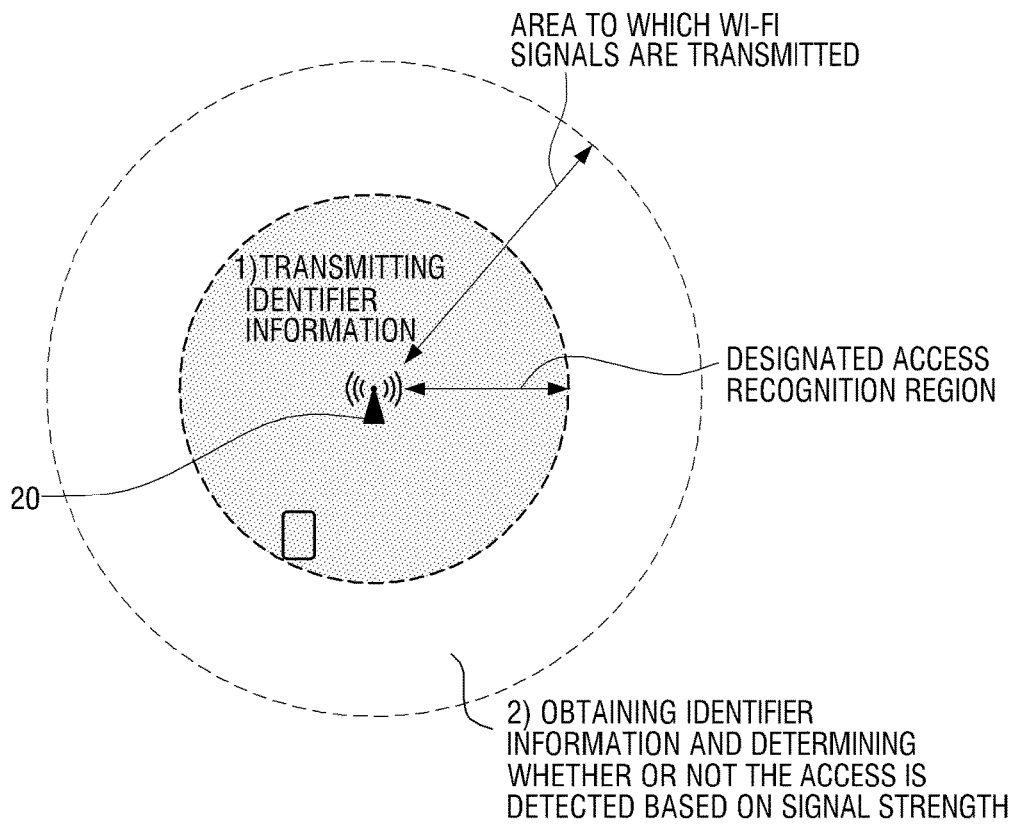
FIG. 19 illustrates detecting an approach according to an embodiment of the present invention.

FIG. 19 illustrates detecting an approach according to an embodiment of the present invention.

The detecting an approach is to determine whether the identifier approaches or moves away by scanning (or searching) the designated identifier so as to obtain the approached identifier's information.

In the event of scanning the identifier, the identifier information is obtained by receiving a beacon signal periodically transmitted by the identifier, and whether or not the identifier approaches or moves away can be determined based on a value of a Received Signal Strength Indication (RSSI) of the above signal.

The identifier can be designated based on a Service Set Identifier (SSID), a Mac Address, a Network mode (Ad-hoc mode, AP mode), etc.

FIGS. 20 to 23 illustrates linking a service according to an embodiment of the present invention.

The linking a service includes obtaining the address of the service provider (or a main unit that provides a service) based on the detected identifier information and performing an interconnection and authentication.

Figure 20:
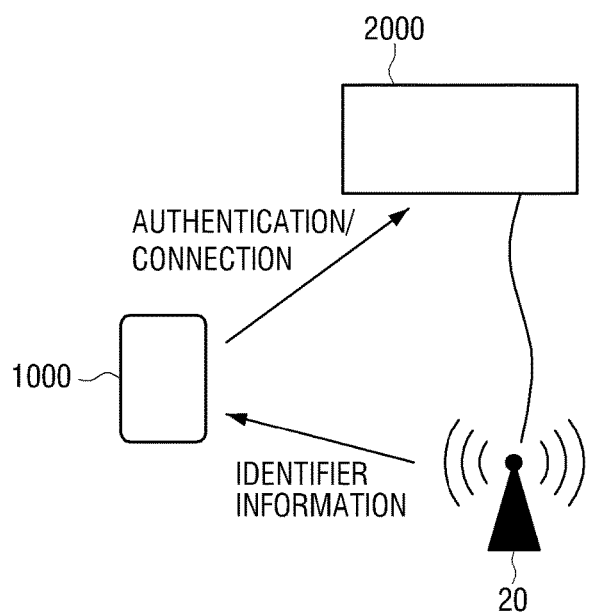
FIGS. 20 to 23 illustrate linking a service according to an embodiment of the present invention.

Referring to FIG. 20, the device 1000 can obtain the address of the service provider 2000 based on the identifier information received from the identifier 20 and can perform an interconnection and authentication with the service provider 2000. In this case, the device 1000 can obtain the address of the service provider 2000 through a method of randomly designating address, as illustrated in FIG. 21.

Figure 21:
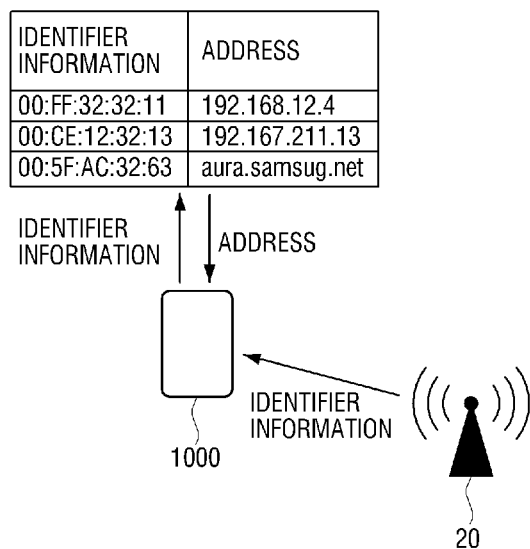

Specifically, as illustrated in FIG. 21, the address of the service provider 2000 can be obtained based on the mapping table between the information of the identifier 20 and the address of the service provider 2000.

Figure 22:
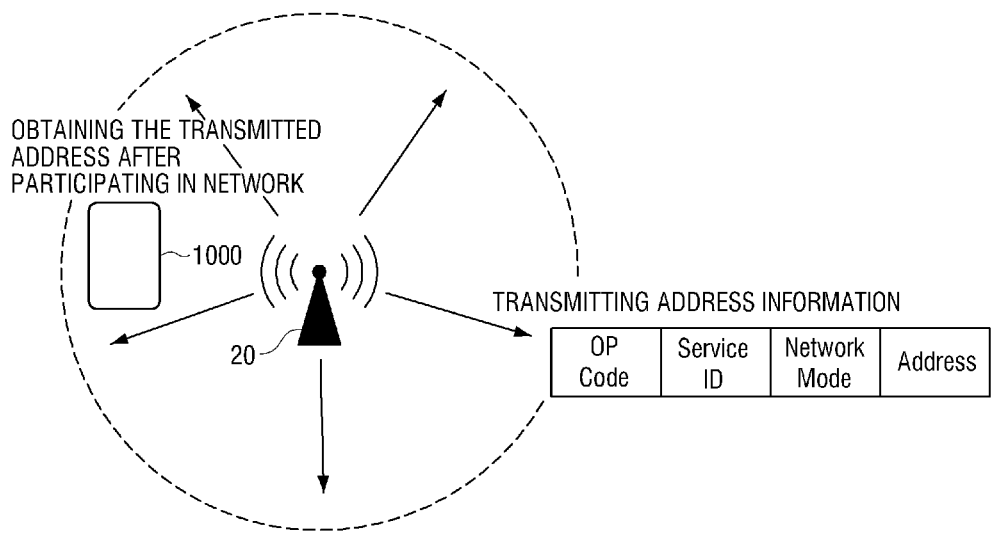

Alternatively, the device 1000 can automatically obtain the address of the service provider 1000, as illustrated in FIG. 22.

Specifically, as illustrated in FIG. 22, the identifier 20 can periodically broadcast the address of the service provider 2000 on the identifier's network, and the device 1000 can obtain the broadcasted address by participating in the related network based on the information of the identifier 20.

Figure 23:
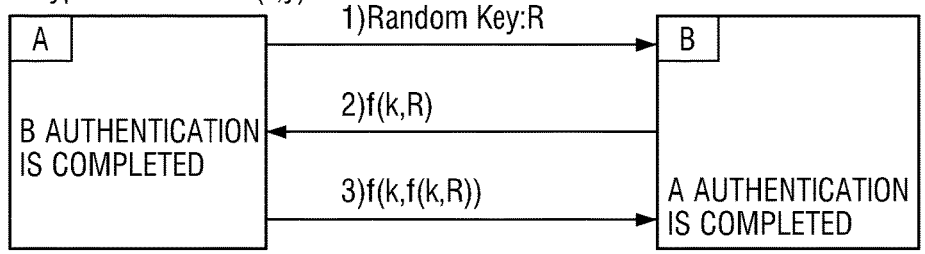

Referring to FIG. 23, in order to execute a guaranteed service, the service provider 2000 and the device 1000 can perform mutual authentication. However, such mutual authentication is merely an embodiment and can be omitted depending on the system structures. Additionally, the mutual authentication can use a secret key mechanism, as illustrated in FIG. 23.

More specifically, referring to FIG. 23, using the secret key mechanism, A (device) and B (service provider) have a secret key (k) in common. The A (device) generates a random numeral R and transmits the same to the B (service provider). The B (service provider) generates f (k, R) based on the transmitted R and transmits the same to the A (device), where f (k, R) is a function impossible in reverse transformation. The A (device) authenticates the B (service provider) based on the transmitted f (k, R) value, and if the authentication is succeed, generates and transmits f (k, f(k, R)) to the B (service provider). The B (service provider) can authenticate A (device) based on the transmitted f (k, f(k, R)).

Figure 24:
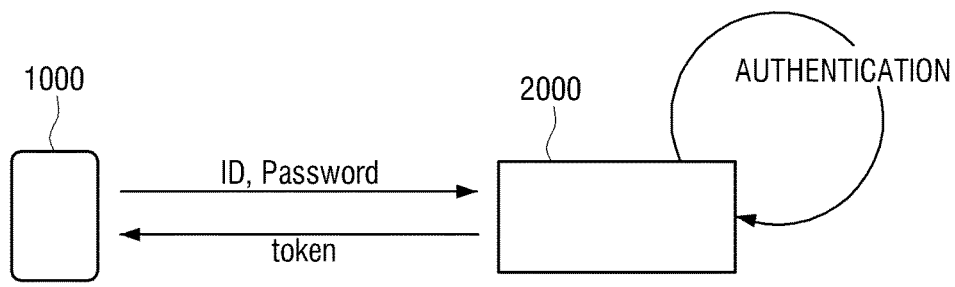
FIG. 24 illustrates authenticating a user according to an embodiment of the present invention.

FIG. 24 illustrates authenticating a user according to an embodiment of the present invention.

Authenticating a user includes transmitting user information and receiving an authentication to receive a personalized service from a service provider. However, such user authentication is merely an embodiment and can be omitted depending on the system structures.

Referring to FIG. 24, the device 1000 transmits the user information (ID, password, etc.) to the service provider 2000, and the service provider 2000 can perform a user authentication based on the user information. Then, if the user authentication is successful, the service provider 2000 generates and transmits a Token to perform a service.

Figure 25:
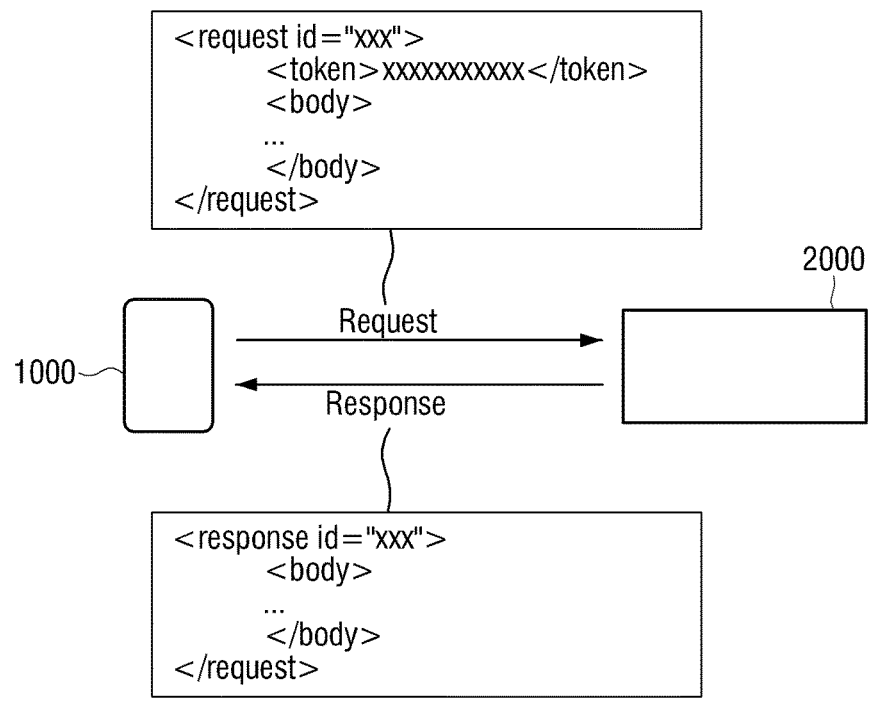
FIG. 25 illustrates performing a service according to an embodiment of the present invention.

FIG. 25 illustrates performing a service according to an embodiment of the present invention.

Referring to FIG. 25, performing a service includes generating and managing a channel to perform a mutual service depending on the protocol defined in the dominant service. As illustrated in FIG. 25, the device 1000 uses the XML format to communicate with each other and provides an Asynchronous-based channel of the Request/Response types.

Figure 26:
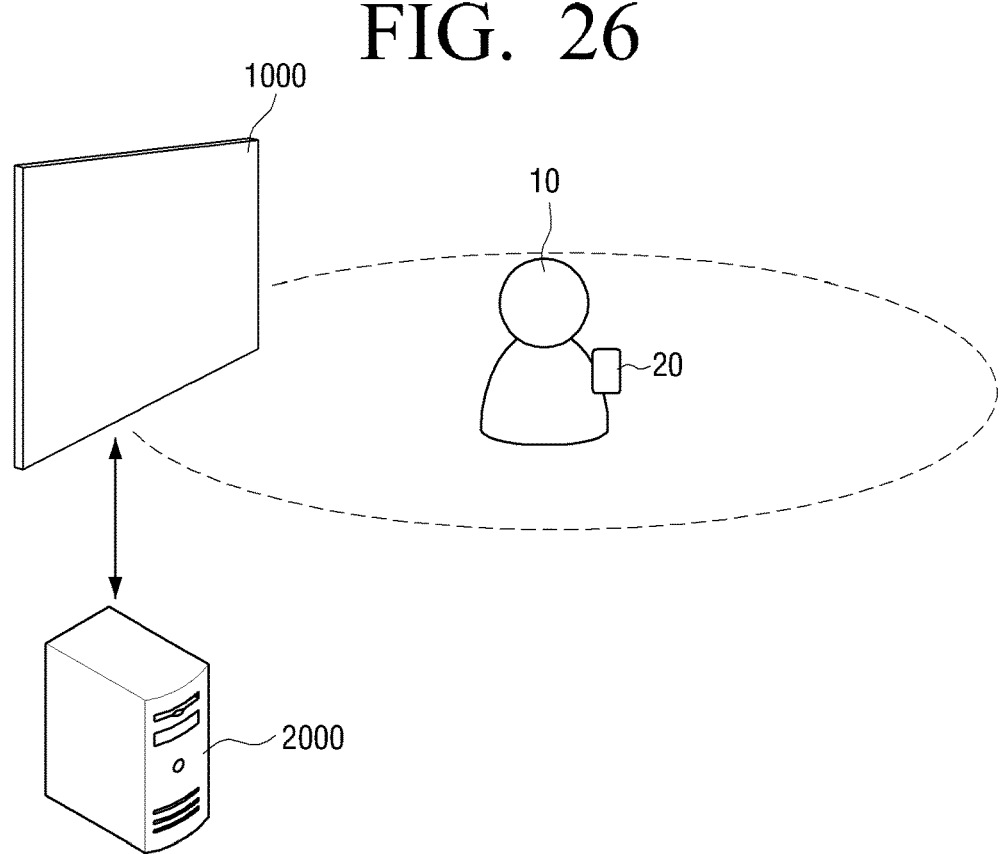
FIG. 26 illustrates a method for performing a service according to an embodiment of the present invention.

FIG. 26 illustrates a method for performing a service according to an embodiment of the present invention.

Referring to FIG. 26, a user 10 carrying identifier 20 approaches the device 1000. For example, the identifier 20 can be a user terminal device.

When detecting the approach, a user can obtain information by receiving signals transmitted from the identifier 20 through the device 1000.

The linking a service can obtain the address of a service providing unit based on the information obtained from the identifier 20.

When authenticating the user, the pre-registered user information can be obtained based on the information obtained from the identifier 20, and an authentication may be executed by requesting the service provider to authenticate the user based on the obtained user information.

Then, the performing a service can be applied to the device 1000 by receiving the user's profile, working environments. etc.

Figure 27:
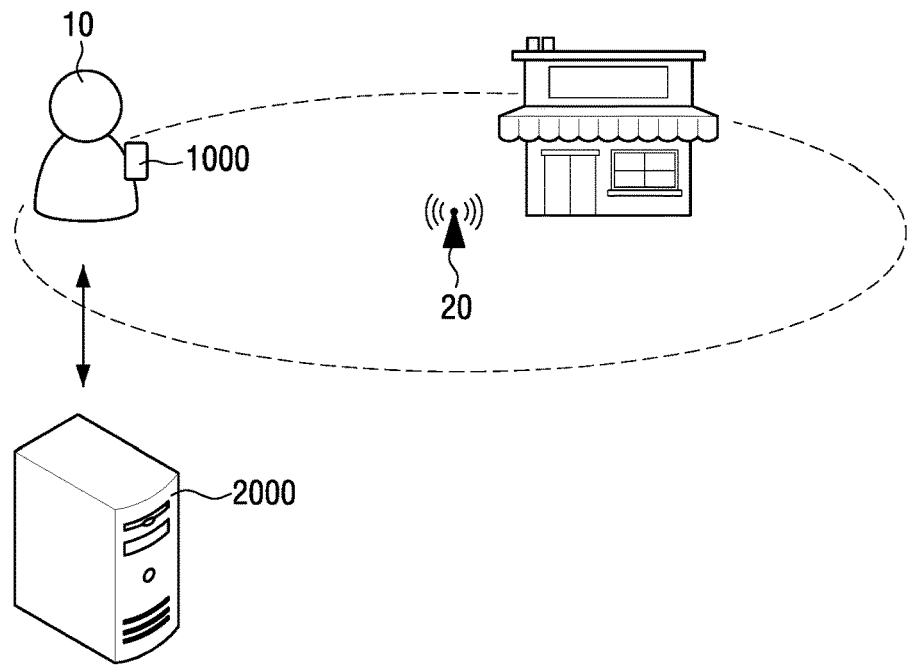
FIG. 27 illustrates a method for performing a service according to an embodiment of the present invention.

FIG. 27 illustrates a method for performing a service according to an embodiment of the present invention.

Referring to FIG. 27, a user 10 carrying device 1000 approaches to identifier 20.

Upon detecting an approach, a user can obtain the information through the device 1000 by receiving a signal transmitted from the identifier 20. For example, the identifier 20 can be provided in a related service enterprise, e.g., a store.

During the linking a service, the device 1000 can participate in the network based on the information obtained from the identifier 20, and a mutual authentication with the service provider 2000 can be executed by obtaining the address of the service provider 2000 broadcasted on the network.

Authenticating a user can inform of an approach of the user and obtain a Token through the device 1000 which transmits the user information to the service provider 2000.

When performing a service, the service provider 2000 can provide a menu and a coupon suitable for the user.

Figure 28:
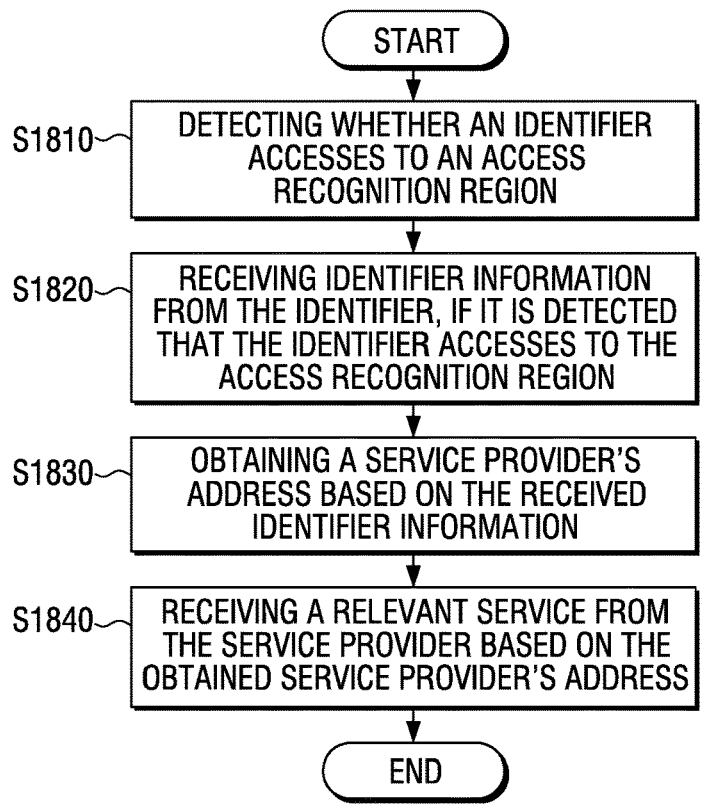
FIG. 28 is a flow chart illustrating a method for performing a service according to an embodiment of the present invention.

FIG. 28 is a flowchart illustrating a method for performing a service according to an embodiment of the present invention.

Referring to FIG. 28, a device detects whether or not the identifier approaches the approach recognition area in step S1810.

If the device detects that the identifier approaches the approach recognition area in step S1810, identifier information is received from the identifier in step S1820.

In step S1830, the address of the service provider is obtained based on the received identifier information.

In step S1840, a related service is received from the service provider based on the address of the service provider obtained in step S1830.

In step S1820, when the identifier information is received, the identifier information can be received from a beacon signal periodically transmitted by the identifier.

In addition, an interconnection and authentication with the service provider can be performed based on the address of the service provider obtained in step S1830. In this case, the interconnection and authentication can be implemented in a secret key mechanism manner.

Further, the user information can be transmitted to the service provider and the user authentication can be performed.

The identifier information and the address of the service provider are stored in a mapping table format, and in step S1830, the address of the service provider can be obtained using the mapping table.

Alternatively, the identifier periodically broadcasts the address of the service provider on the identifier's network, and in the step S1830, the device participates in the related network based on the identifier information and can obtain the broadcasted address of the service provider.

In step S1810, the device determines whether the identifier approaches based on the Received Signal Strength Indication (RSSI) value of the beacon signal periodically transmitted by the identifier.

In step S1810, the identifier can be detected based on at least one of the identifier's SSID, Mac Address, and Network mode information so as to determine whether the detected identifier approaches.

For example, the device can be a user terminal device, and the service provider can be an electronic blackboard, a Desktop PC, a Notebook PC, a Tabletop display, a Smart Board, a Large Format Display Device, a Mobile Device, a Tablet, etc.

Alternatively, the identifier can be a user terminal device, and the device can be an electronic blackboard, a Desktop PC, a Notebook PC, a Tabletop display, a Smart Board, a Large Format Display Device, a Mobile Device, a Tablet, etc.

As described above, a personalized service can be provided in the present invention when the user approaches to the device only. In addition, if the device is used with other users, a connection point can be used for a specific user. Accordingly, a personalized service can be provided per each user without going through complicated processes.

The foregoing embodiments and advantages are merely exemplary and are not to be construed as limiting the present inventive concept. These embodiments can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A method of performing a service in an electronic apparatus, the method comprising:
based on the electronic apparatus detecting an approach of an identifier, receiving identifier information from the identifier;
obtaining address information of a service provider based on the identifier information received from the identifier;
requesting service information to the service provider based on user information of the electronic apparatus and the address information of the service provider;
receiving the service information in response to the request to the service provider; and
displaying the received service information on a display of the electronic apparatus; wherein the identifier information and the address of the service provider are stored in a mapping table, and the address of the service provider is obtained from the mapping table.

2. The method of claim 1, further comprising:
requesting the service provider to authenticate the user based on the obtained user information;
receiving a personalized service from the service provider based on the address of the service provider; and
displaying the personalized area corresponding to the personalized service.

3. The method of claim 2, wherein the personalized service comprises at least one of a user's profile, working environments, a menu and a coupon.

4. The method of claim 1, wherein the identifier information is received from a beacon signal that is periodically transmitted from the identifier.

5. The method of claim 1, further comprising performing an interconnection and an authentication with the service provider based on the address of the service provider.

6. The method of claim 4, wherein the interconnection and the authentication are performed using a secret key mechanism.

7. The method of claim 2, wherein requesting the service provider to authenticate the user further comprises:
transmitting user information to the service provider; and
performing a user authentication.

8. The method of claim 1, further comprising detecting whether the identifier approaches an approach recognition area based on analyzing a Received Signal Strength Indication (RSSI) value of a beacon signal transmitted from the identifier.

9. The method of claim 8, wherein detecting whether the identifier approaches the approach recognition area comprises identifying at least one of a Service Set IDentifier (SSID), a Mac Address, and network mode information of the identifier.

10. The method of claim 1, wherein the service provider includes at least one of an electronic blackboard, a smart television, a kiosk, and a billboard.

11. An electronic apparatus, comprising: a display;
a communication unit configured to receive identifier information from an identifier;
a storage unit configured to store the identifier information and an address of a service provider in a mapping table; and a processor configured to:
based on the electronic apparatus detecting an approach of an identifier, control the communication unit to receive the identifier information from the identifier, obtain address information of the service provider based on the identifier information received from the identifier,
request service information to the service provider based on user information of the electronic apparatus and the address information of the service provider,
receive the service information in response to the request to the service provider, control the display to display the received service information; and obtain the address of the service provider using the mapping table.

12. The electronic apparatus of claim 11, wherein the processor is further configured to request the service provider to authenticate the user based on the obtained user information, receive a personalized service from the service provider based on the address of the service provider, and display a personalized area corresponding to the personalized service.

13. The electronic apparatus of claim 12, wherein the personalized service comprises at least one of a user's profile, working environments, a menu and a coupon.

14. The electronic apparatus of claim 11, wherein the processor is further configured to perform an interconnection and an authentication with the service provider based on the address of the service provider.

15. The electronic apparatus of claim 14, wherein the interconnection and authentication are performed using a secret key mechanism.

16. The electronic apparatus of claim 12, wherein the processor is further configured to transmit user information to the service provider and performs a user authentication.

17. The electronic apparatus of claim 11, further comprising an approach recognition unit configured to detect when the identifier approaches based on a Received Signal Strength Indication (RSSI) value of a beacon signal transmitted from the identifier, or based on at least one of a Service Set IDentifier (SSID), a Mac Address, and network mode information of the identifier.

18. The electronic apparatus of claim 11, wherein the identifier is a user terminal device carried by a user, and wherein the service provider includes at least one of an electronic blackboard, a smart television, a kiosk, and a billboard.

\* \* \* \* \*